US012332005B2

(12) United States Patent
Kloepfer et al.

(10) Patent No.: US 12,332,005 B2
(45) Date of Patent: Jun. 17, 2025

(54) USER AUTHENTICATION AT AN ELECTROMECHANICAL GUN

(71) Applicant: Biofire Technologies Inc., Broomfield, CO (US)

(72) Inventors: Kai Thorin Kloepfer, Denver, CO (US); Bryan Edward Rogers, Aurora, CO (US); Donna Kelley, Louisville, CO (US); Jack Hugo Thiesen, Firestone, CO (US); Timothy Joel Thorson, Castle Rock, CO (US); Christopher James Owens, Denver, CO (US)

(73) Assignee: Biofire Technologies Inc., Broomfield, CO (US)

( * ) Notice: Subject to any disclaimer, the term of this patent is extended or adjusted under 35 U.S.C. 154(b) by 0 days.

(21) Appl. No.: 18/431,770

(22) Filed: Feb. 2, 2024

(65) Prior Publication Data

US 2024/0175653 A1 May 30, 2024

Related U.S. Application Data

(62) Division of application No. 17/656,321, filed on Mar. 24, 2022, now Pat. No. 11,892,254.

(Continued)

(51) Int. Cl.

*F41A 17/06* (2006.01)
*G07C 9/00* (2020.01)

(Continued)

(52) U.S. Cl.

CPC ........ *F41A 17/066* (2013.01); *G07C 9/00563* (2013.01); *G07C 9/26* (2020.01); *G07C 9/29* (2020.01)

(58) Field of Classification Search

CPC ..................................................... F41A 17/066

See application file for complete search history.

(56) References Cited

U.S. PATENT DOCUMENTS

| | | | | |
|---|---|---|---|---|
| 9,857,133 | B1 * | 1/2018 | Kloepfer | G06F 21/32 |
| 10,139,179 | B2 | 11/2018 | Downing | |

(Continued)

FOREIGN PATENT DOCUMENTS

| | | | | |
|---|---|---|---|---|
| CN | 101459518 | B | 4/2011 | |
| WO | WO-0036359 | A2 * | 6/2000 | F41A 17/066 |
| WO | 2014130625 | A1 | 8/2014 | |

OTHER PUBLICATIONS

"International Search Report and Written Opinion" mailed on Aug. 24, 2022 for PCT Application No. PCT/US2022/071303, 29 pages.

(Continued)

*Primary Examiner* — Jonathan C Weber

(74) *Attorney, Agent, or Firm* — Perkins Coie LLP; Andrew T. Pettit

(57) ABSTRACT

The present disclosure provides systems and techniques for authenticating a user at gun. The gun may include an authentication manager capable of implementing logic, processing signals, or executing instructions. The authentication manager may receive first query data from a first authentication sensor of the gun, receive second query data from a second authentication sensor of the gun, perform an authentication procedure to determine whether the first query data or the second query data matches enrollment data, where a match is determined based on the first query data or the second query data and the enrollment data (Continued)

satisfying a similarity threshold. The authentication manager may determine that the user is authorized to operate the gun and transmit a signal in response to the determining that the user is authorized to operate the gun. The signal may cause the gun to enter an active state which allows the gun to be fired.

15 Claims, 15 Drawing Sheets

Related U.S. Application Data

(60) Provisional application No. 63/165,704, filed on Mar. 24, 2021.

(51) Int. Cl.
*G07C 9/26* (2020.01)
*G07C 9/29* (2020.01)

(56) References Cited

U.S. PATENT DOCUMENTS

| | | | | |
|---|---|---|---|---|
| 11,127,013 | B1 | 9/2021 | Boyd et al. | |
| 11,301,586 | B1 | 4/2022 | Poh et al. | |
| 2002/0112390 | A1 | 8/2002 | Harling et al. | |
| 2010/0060419 | A1* | 3/2010 | Smith | F41A 17/066 340/5.83 |
| 2013/0019510 | A1* | 1/2013 | Kemmerer | F41A 17/066 42/70.11 |
| 2013/0019512 | A1* | 1/2013 | Kemmerer | F41A 17/066 42/70.11 |
| 2013/0125441 | A1* | 5/2013 | Westwood | F41A 17/28 42/70.11 |
| 2014/0366419 | A1 | 12/2014 | Allan et al. | |
| 2018/0142977 | A1 | 5/2018 | Kloepfer et al. | |
| 2019/0222771 | A1 | 7/2019 | Hedeen et al. | |
| 2021/0211291 | A1 | 7/2021 | Jindal et al. | |
| 2021/0382970 | A1 | 12/2021 | Odinokikh et al. | |
| 2024/0160690 | A1 | 5/2024 | Ito et al. | |

OTHER PUBLICATIONS

Bhoyar. "Biometric Folder Locking System using Fuzzy Vaul\ for Face" pp. 1-4, International 1-15 Journal of Computer Applications (0975-8887) vol. 57—No. 3. Online. Nov. 2012.

Abirami S., et al., "Secure Biometric Authentication System using Chaotic Encryption", Abirami, S et al. "Secure Biometric Authentication System using Chaotic Encryption" International Research Journal of Engineering and Technology(IRJET), Apr. 2016, vol. 3, Issue 4, pp. 713-718, 2016.

Dwivedi, Rudresh , "A non-invertible cancelable fingerprint template generation based on ridge feature transformation", Dwivedi, Rudresh et al. "A non-invertible cancelable fingerprint template generation based on ridge feature transformation" Open Access Journal, IEEE Access, vol. 4, 2016, pp. 1-17.

Gupta, Pallav , et al., "Efficient Fingerprint-based User Authentication for Embedded Systems", Gupta, Pallav et al. "Efficient Fingerprint-based User Authentication for Embedded Systems" Proceedings. 42nd Design Automation Conference, 2005., 2005, pp. 244-247.

Jain, Anil K., et al., "Biometric Template Security", Jain, Anil K. et al. "Biometric Template Security" EURASIP Journal on Advances in Signal Processing, vol. 2008, Article ID 579416, 17 pages.

Kaur, Harkeerat , et al., "Non-invertible Biometric Encryption to Generate Cancelable Biometric Templates", Kaur, Harkeerat et al. "Non-invertible Biometric Encryption to Generate Cancelable Biometric Templates" Proceedings of the World Congress on Engineering and Computer Science, vol. I, Oct. 2017, 4 pgs.

Rathgeb, Christian , et al., "A survey on biometric cryptosystems and cancelable biometrics", Rathgeb, Christian et al. "A survey on biometric cryptosystems and cancelable biometrics" EURASIP Journal on Information Security, 2011, 25 pgs.

Streit, Scott , et al., "Privacy-Enabled Biometric Search", Streit, Scott et al. "Privacy-Enabled Biometric Search" arXiv, Privacy-Enabled Biometric Search, https://arxiv.org/abs/1708.04726, Aug. 2017, 5 pgs.

Yang, Shenglin , et al., Yang, Shenglin et al. "A Secure Fingerprint Matching Technique" WBMA '03, Nov. 2003, 6 pgs.

* cited by examiner

1300

USER AUTHENTICATION AT AN ELECTROMECHANICAL GUN

CROSS-REFERENCE TO RELATED APPLICATIONS

This application is a divisional of U.S. application Ser. No. 17/656,321, titled "User Authentication at an Electromechanical Gun" and filed Mar. 24, 2022, now U.S. Pat. No. 11,892,254, which claims priority to U.S. Provisional Application No. 63/165,704, titled "User Authentication" and filed on Mar. 24, 2021, which are incorporated by reference herein in their entireties.

FIELD OF TECHNOLOGY

The teachings disclosed herein generally relate to guns, and more specifically to authenticating a user at an electromechanical gun.

BACKGROUND

The term "gun" generally refers to a ranged weapon that uses a shooting tube (also referred to as a "barrel") to launch solid projectiles, though some instead project pressurized liquid, gas, or even charged particles. These projectiles may be free flying (e.g., as with bullets), or these projectiles may be tethered to the gun (e.g., as with spearguns, harpoon guns, and electroshock weapons such as TASER® devices). The means of projectile propulsion vary according to the design (and thus, type of gun), but are traditionally effected pneumatically by a highly compressed gas contained within the barrel. This gas is normally produced through the rapid exothermic combustion of propellants (e.g., as with firearms) or mechanical compression (e.g., as with air guns). When introduced behind the projectile, the gas pushes and accelerates the projectile down the length of the barrel, imparting sufficient launch velocity to sustain it further towards a target after exiting the muzzle.

Most guns use compressed gas that is confined by the barrel to propel the projectile up to high speed, though the term "gun" may be used more broadly in relation to devices that operate in other ways. Accordingly, the term "gun" may not only cover handguns, shotguns, rifles, single-shot firearms, semi-automatic firearms, and automatic firearms, but also electroshock weapons, light-gas guns, plasma guns, and the like.

Significant energies have been spent developing safer ways to use, transport, store, and dispose guns. Gun safety is an important aspect of avoiding unintentional injury due to mishaps like accidental discharges and malfunctions. Gun safety is also becoming an increasingly important aspect of designing and manufacturing guns. While there have been many attempts to make guns safer to use, transport, and store, those attempts have had little impact.

SUMMARY

The systems and techniques described herein support user authentication at an electromechanical gun. The term "gun," as used herein, may be used to refer to a lethal force weapon, such as a pistol, a rifle, a shotgun, a semi-automatic firearm, or an automatic firearm; a less-lethal weapon, such as a stun-gun or a projectile emitting device; or an assembly of components operable to selectively discharge matter or charged particles, such as a firing mechanism.

Generally, the described systems and techniques described herein provide for authenticating a user at a gun. The gun may include an authentication manager capable of implementing logic, processing signals, or executing instructions. The authentication manager may receive first query data from a first authentication sensor of the gun, receive second query data from a second authentication sensor of the gun, perform an authentication procedure to determine whether the first query data or the second query data matches enrollment data, where a match is determined based on the first query data or the second query data and the enrollment data satisfying a similarity threshold. The authentication manager may determine that the user is authorized to operate the gun, and the authentication manager may and transmit a signal in response to determining that the user is authorized to operate the gun. The signal may cause the gun to unlock such that the gun enters an active state which allows the gun to be fired.

Figure 1:
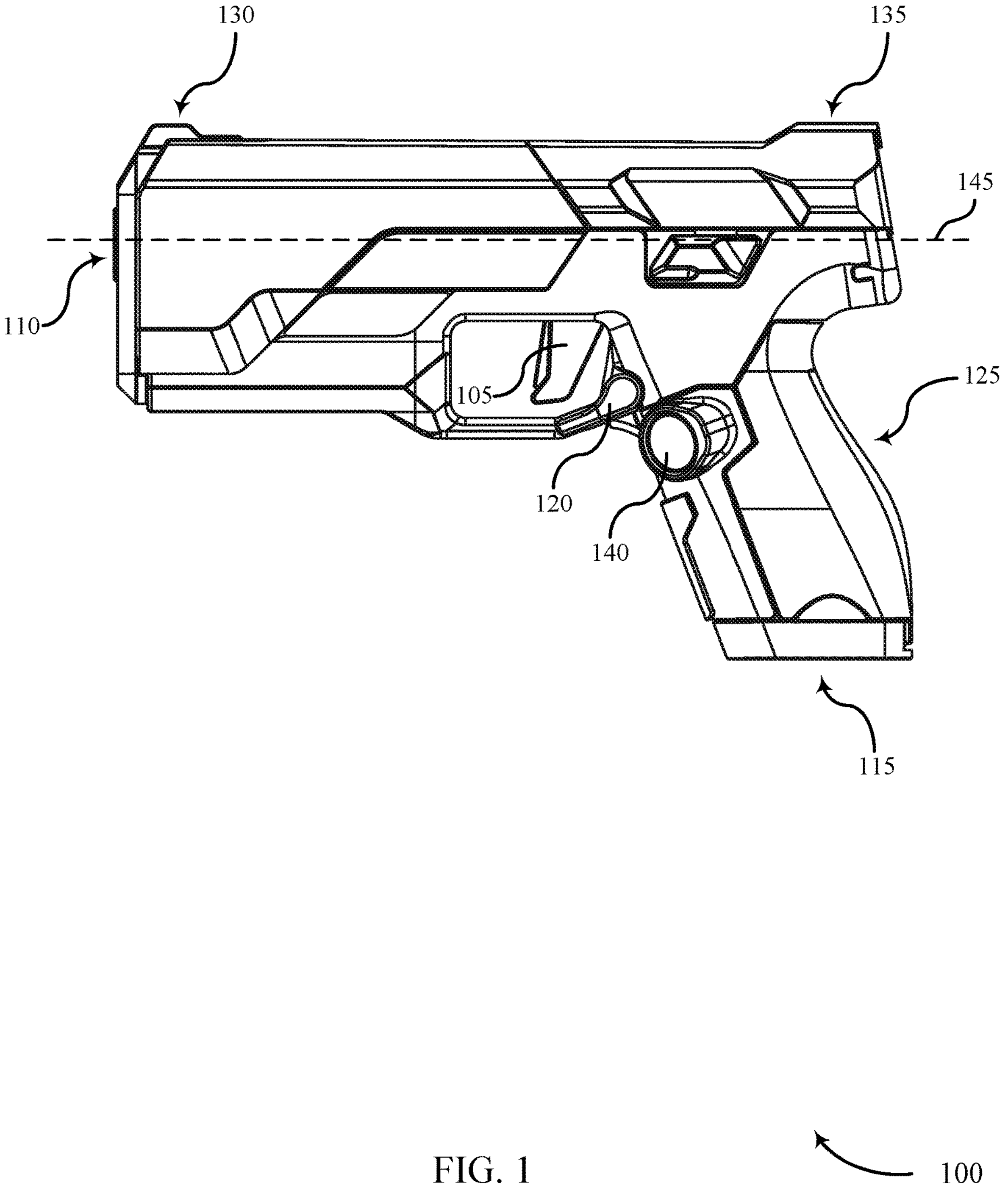
FIG. 1 illustrates an example of a gun that supports user authentication in accordance with aspects of the present disclosure.

Various features of the technology described herein will become more apparent to those skilled in the art from a study of the Detailed Description in conjunction with the drawings. Various embodiments are depicted in the drawings for the purpose of illustration. However, those skilled in the art will recognize that alternative embodiments may be employed without departing from the principles of the technology. Accordingly, the technology is amenable to modifications that may not be reflected in the drawings.

DETAILED DESCRIPTION

Some conventional guns use authentication data to verify that the individual holding the gun is authorized to operate the gun. For example, a gun may include a radio-frequency identification (RFID) reader that identifies an RFID tag embedded in a glove or in a ring worn by the operator. While the RFID reader can verify that the RFID tag is near the gun, relying on RFID communication is vulnerable to stolen tag scenarios, as a thief may steal the RFID tag and successfully operate the gun, potentially using it against the actual owner of the gun.

In another example, a gun may include a fingerprint scanner that collects a fingerprint and uses the fingerprint to verify the identity of the individual holding the gun. But relying on just a fingerprint scanner to verify the identity of the individual holding the gun restricts the scenarios in which the gun can be used. For example, operating such a gun in cold conditions may not be feasible, as gloves worn by the operator may prevent the fingerprint scanner from collecting a useable fingerprint, thereby rendering the gun inoperable and reducing the environments in which the gun can be used.

Guns that rely solely on a fingerprint scanner to authenticate the operator of the gun create a single point of failure and limit the scenarios in which the gun can be used, as gloves, sweat or dirt can obstruct the fingerprint scanner and prevent the gun from verifying the identity of the operator, thereby reducing the reliability and useability of the gun. Guns that rely solely on RFID communication are vulnerable to nefarious actors, as a thief could steal the RFID tag and operate the gun. Conventional guns often rely on authentication systems that can be circumvented, such as when the authentication system relies on just an RFID reader to authenticate the operator, or on authentication systems that can be unreliable, such as when the authentication system relies on just a fingerprint scanner to authenticate the operator.

Additionally, conventional guns fail to adequately protect sensitive data. For example, some conventional guns store biometric data in cleartext (also called "plaintext"), leaving the biometric data vulnerable to theft. Unlike a text-based password that can be changed in response to the password becoming compromised, biometric data cannot be changed, and conventional guns lack adequate protection for sensitive data, such as biometric data.

Introduced here, therefore, are systems and techniques for quickly and reliably authenticating an operator (also referred to as a "user") of a gun. A gun may include multiple authentication sensors to allow the gun to collect disparate forms of biometric data—which can be used individually or collectively for authentication—to improve the speed or reliability of user authentication. As one example, multiple biometric sensors can be used to collect different forms of biometric data, and an authentication manager can use the biometric data to authenticate the operator of the gun. At a high level, the authentication manager can authenticate the operator of the gun through independent analysis of the different forms of biometric data. In response to successfully authenticating the operator, the gun can be unlocked or activated such that the gun transitions to an operable state that allows the gun to be fired. Note that in order for authentication to be deemed successful, the authentication manager may need to confirm (i) that each form of biometric data indicates that the operator is authentic, (ii) a majority of the forms of biometric data indicate that the operator is authentic, or (iii) at least one of the forms of biometric data indicate that the operator is authentic.

Using multiple biometric sensors improves reliability, as the authentication manager can authenticate the operator based on biometric data collected at any one or any combination of the multiple biometric sensors. For example, if the operator is wearing gloves, the gun may authenticate the operator based on an image sensor and a facial recognition procedure. Using multiple biometric sensors can also reduce latency and improve authentication speed, as the authentication manager can authenticate the operator based on whichever biometric data is collected first. For example, a fingerprint may be collected as the operator grips the gun and the authentication manager may authenticate the operator based on the collected fingerprint, even if the operator is not in view of the image sensor and the facial recognition procedure has not been completed. In some examples, multiple disparate forms of biometric data (e.g., fingerprint and facial, vein pattern and iris, etc.) may be collected and analyzed, and the operator may be authenticated based on determining that both forms of biometric data are valid, thereby further improving reliability.

In another example, a biometric sensor may be used in conjunction with a non-biometric sensor. For example, the authentication manager may authenticate the operator based on valid biometric data and an RFID reader identifying a valid RFID tag. In some examples, the operator may configure aspects of the authentication procedure. For example, a verified operator may configure the gun to unlock based on two forms of biometric data, or the verified operator may configure the gun to unlock based on a form of biometric data and a form of non-biometric data. In another example, the verified operator may configure functions or behaviors of the gun, such as automatically turning on a flashlight in response to successfully authenticating the operator, keeping a laser powered off upon successfully authenticating the operator, generating a haptic pulse in response to successfully authenticating the operator, etc. The systems and techniques described herein include multiple authentication sensors that allow the gun to collect multiple forms of authentication data, thereby reducing latency and increasing reliability of user authentication procedures. Authentication data may include biometric data (e.g., fingerprint data, facial data, vein pattern data, etc.), non-biometric data (e.g., near-field communication (NFC) data, Bluetooth low energy (BLE) data, RFID data, etc.), or both. Authentication data may be referred to as enrollment data when used to enroll a user, and authentication data may be referred to as query data when used to authenticate a user. In some examples, the gun may transform (e.g., encrypt, hash, transform, encode, etc.) enrollment data and store the transformed enrollment data in non-volatile memory of the gun, and the gun may discard or refrain from storing query data in non-volatile memory. Thus, the gun may transform the enrollment data, so as to inhibit unauthenticated use even in the event of unauthorized access of the gun.

The systems and techniques described herein improve data security and user privacy. Instead of storing sensitive data on the gun, the systems and techniques described herein allow the gun to refrain from storing the sensitive data. Instead of storing sensitive data, the gun may transform sensitive data such that the transformed data does not reveal information about the original sensitive data, and the gun may store the transformed data. For example, the gun may generate a transformation key (or simply "key"), receive biometric data as part of an enrollment procedure, transform the biometric data based on the key, store the transformed data, and ensure that the original biometric data is not stored anywhere on the gun. Because the biometric data is used as part of the enrollment procedure, the biometric data could also be called "enrollment data." The gun may receive additional biometric data (also referred to as "query data") as part of an authentication procedure, transform the query data based on the key as part of an authentication procedure, where the operator may be determinized to be a valid operator based on the transformed query data matching the transformed enrollment data. The key may be an example of a cryptographic key, a projection matrix, or a coordinate shifting key. In some cases, the gun may collect entropy data based on a sensor coupled with (e.g., part of) the gun, such as an accelerometer, and the key may be generated according to a key derivation function and the collected entropy data.

Embodiments may be described in the context of executable instructions for the purpose of illustration. For example, a processor housed in a gun may be described as being capable of executing instructions that permit the user to be authenticated based on a biometric identifier, such as a fingerprint or an iris. However, those skilled in the art will recognize that aspects of the technology could be implemented via hardware, firmware, or software.

Terminology

References in the present disclosure to "an embodiment" or "some embodiments" means that the feature, function, structure, or characteristic being described is included in at least one embodiment. Occurrences of such phrases do not necessarily refer to the same embodiment, nor are they necessarily referring to alternative embodiments that are mutually exclusive of one another.

Unless the context clearly requires otherwise, the terms "comprise," "comprising," and "comprised of" are to be construed in an inclusive sense rather than an exclusive or exhaustive sense (i.e., in the sense of "including but not limited to"). The term "based on" is also to be construed in an inclusive sense rather than an exclusive or exhaustive sense. For example, the phrase "A is based on B" does not imply that "A" is based solely on "B." Thus, the term "based on" is intended to mean "based at least in part on" unless otherwise noted.

The terms "connected," "coupled," and variants thereof are intended to include any connection or coupling between two or more elements, either direct or indirect. The connection or coupling can be physical, electrical, logical, or a combination thereof. For example, elements may be electrically or communicatively coupled with one another despite not sharing a physical connection. As one illustrative example, a first component is considered coupled with a second component when there is a conductive path between the first component and the second component. As another illustrative example, a first component is considered coupled with a second component when the first component and the second component are fastened, joined, attached, tethered, bonded, or otherwise linked.

The term "manager" may refer broadly to software, firmware, or hardware. Managers are typically functional components that generate one or more outputs based on one or more inputs. A computer program may include or utilize one or more managers. For example, a computer program may utilize multiple managers that are responsible for completing different tasks, or a computer program may utilize a single manager that is responsible for completing all tasks. As another example, a manager may include an electrical circuit that produces an output based on hardware components, such as transistors, logic gates, analog components, or digital components. Unless otherwise noted, the terms "manager" and "module" may be used interchangeably herein.

When used in reference to a list of multiple items, the term "or" is intended to cover all of the following interpretations: any of the items in the list, all of the items in the list, and any combination of items in the list. For example, the list "A, B, or C" indicates the list "A" or "B" or "C" or "A and B" or "A and C" or "B and C" or "A and B and C."

Overview of Guns

FIG. 1 illustrates an example of a gun 100 that supports systems and techniques for authenticating a user in accordance with aspects of the present disclosure. The gun 100 includes a trigger 105, a barrel 110, a magazine 115, and a magazine release 120. While these components are generally found in firearms, such as pistols, rifles, and shotguns, those skilled in the art will recognize that the technology described herein may be similarly appliable to other types of guns as discussed above. As an example, comparable components may be included in vehicle-mounted weapons that are not intended to be held or operated by hand. While not shown in FIG. 1, the gun 100 may also include a striker (e.g., a ratcheting striker or rotating striker) or a hammer that can be actuated in response to pulling the trigger 105. Pulling the trigger 105 may result in the release of the striker or hammer, thereby causing the striker or hammer to contact a firing pin, percussion cap, or primer, so as to ignite a propellant and fire a projectile through the barrel 110. Embodiments of the gun 100 may also include a blowback system, a locked breech system, or any combination thereof. These systems are more commonly found in self-reloading firearms. The blowback system may be responsible for obtaining energy from the motion of the case of the projectile as it is pushed to the rear of the gun 100 by expanding propellant, while the locked breech system may be responsible for slowing down the opening of the breech of a self-reloading firearm when fired. Accordingly, the gun 100 may support the semi-automatic firing of projectiles, the automatic firing of projectiles, or both.

The gun 100 may include one or more safeties that are meant to reduce the likelihood of an accidental discharge or an unauthorized use. The gun 100 may include one or more mechanical safeties, such as a trigger safety or a firing pin safety. The trigger safety may be incorporated in the trigger 105 to prevent the trigger 105 from moving in response to lateral forces placed on the trigger 105 or dropping the gun. The term "lateral forces," as used herein, may refer to a force that is substantially orthogonal to a central axis 145 that extends along the barrel 110 from the front to the rear of the gun 100. The firing pin safety may block the displacement path of the firing pin until the trigger 105 is pulled. Additionally or alternatively, the gun 100 may include one or more electronic safety components, such as an electrically actuated drop safety. In some cases, the gun 100 may include both mechanical and electronic safeties to reduce the potential for an accidental discharge and enhance the overall safety of the gun 100.

The gun 100 may include one or more sensors, such as a user presence sensor 125 and a biometric sensor 140. In some cases, the gun 100 may include multiple user presence sensors 125 whose outputs can collectively be used to detect the presence of a user. For example, the gun 100 may include a time of flight (TOF) sensor, a photoelectric sensor, a capacitive sensor, an inductive sensor, a force sensor, a resistive sensor, or a mechanical switch. As another example, the gun 100 may include a proximity sensor that is configured to emit an electromagnetic field or electromagnetic radiation, like infrared, and looks for changes in the field or return signal. As another example, the gun 100 may include an audio input mechanism (e.g., a transducer implemented in a microphone) that is configured to generate a signal that is representative of nearby sounds, and the presence of the user can be detected based on an analysis of the signal.

The gun 100 may also include one or more biometric sensors 140 as shown in FIG. 1. For example, the gun 100 may include a fingerprint sensor (also referred to as a "fingerprint scanner"), an image sensor, or an audio input mechanism. The fingerprint scanner may generate a digital image (or simply "image") of the fingerprint pattern of the user, and the fingerprint pattern can be examined (e.g., on the gun 100 or elsewhere) to determine whether the user should be verified. The image sensor may generate an image of an anatomical feature (e.g., the face or eye) of the user, and the image can be examined (e.g., on the gun 100 or elsewhere) to determine whether the user should be verified. Normally, the image sensor is a charge-coupled device (CCD) or complementary metal-oxide semiconductor (CMOS) sensor that is included in a camera module (or simply "camera") able to generate color images. The image sensor need not necessarily generate images in color, however. In some embodiments, the image sensor is configured to generate ultraviolet, infrared, or near infrared images. Regardless of its nature, images generated by the image sensor can be used to authenticate the presence or identity of the user. As an example, an image generated by a camera may be used to perform facial recognition of the user. The audio input mechanism may generate a signal that is representative of audio containing the voice of the user, and the signal can be examined (e.g., on the gun 100 or elsewhere) to determine whether the user should be verified. Thus, the signal generated by the audio input mechanism may be used to perform speaker recognition of the user. Including multiple biometric sensors in the gun 100 may support a robust authentication procedure that functions in the event of sensor failure, thereby improving gun reliability. Note, however, that each of the multiple biometric sensors may not provide the same degree or confidence of identity verification. As an example, the output produced by one biometric sensor (e.g., an audio input mechanism) may be used to determine whether a user is present while the output produced by another biometric sensor (e.g., a fingerprint scanner or image sensor) may be used to verify the identity of the user in response to a determination that the user is present.

The gun 100 may support various types of aiming sights (or simply "sights"). At a high level, a sight is an aiming device that may be used to assist in visually align the gun 100 (and, more specifically, its barrel 110) with a target. For example, the gun 100 may include iron sights that improve aim without the use of optics. Additionally or alternatively, the gun 100 may include telescopic sights, reflex sights, or laser sights. In FIG. 1, the gun 100 includes two sights—namely, a front sight 130 and a rear sight 135. In some cases, the front sight 130 or the rear sight 135 may be used to indicate gun state information. For example, the front sight 130 may include a single illuminant that is able to emit light of different colors to indicate different gun states. As another example, the front sight 130 may include multiple illuminants, each of which is able to emit light of a different color, that collectively are able to indicate different gun states. One example of an illuminant is a light-emitting diode (LED).

The gun 100 may fire projectiles, and the projectiles may be associated with lethal force or less-lethal force. For example, the gun 100 may fire projectiles containing lead, brass, copper, zinc, steel, plastic, rubber, synthetic polymers (e.g., nylon), or a combination thereof. In some examples, the gun 100 is configured to fire lethal bullets containing lead, while in other cases the gun 100 is configured to fire less-lethal bullets containing rubber. As mentioned above, the technology described herein may also be used in the context of a gun that fires prongs (also referred to as "darts") which are intended to contact or puncture the skin of a target and then carry electric current into the body of the target. These guns are commonly referred to as "electronic control weapons" or "electroshock weapons." One example of an electroshock weapon is a TASER device.

As further discussed herein, the gun 100 may include an authentication manager capable of implementing logic, processing signals, or executing instructions. The authentication manager may receive first query data from a first authentication sensor of the gun 100, receive second query data from a second authentication sensor of the gun 100, perform an authentication procedure to determine whether the first query data or the second query data matches enrollment data, where a match is determined based on the first query data or the second query data and the enrollment data satisfying a similarity threshold. As an example, the first authentication data is fingerprint data received from the biometric sensor 140, and the second authentication data is facial data received from an image sensor. As another example, the first authentication data is fingerprint data, palm print data, facial data, iris data, or cornea data, and the second authentication data is RFID data, personal information number (PIN) data, NFC data, or Bluetooth data.

The authentication manager may determine that the operator is authorized to operate the gun 100 and transmit a signal in response to determining that the operator is authorized to operate the gun 100. The signal may cause the gun 100 to enter an active state which allows the gun 100 to be fired. For example, the authentication manager may transmit the signal to a processor, and the processor may transition to the active state based on receiving the signal. Transitioning to the active state may include disengaging an inhibitor mechanism, charging a capacitor, discharging electric current, compressing gas, or otherwise performing an action that places the gun 100 in a state that allows the gun 100 to fire a projectile through the barrel 110.

Figure 2:
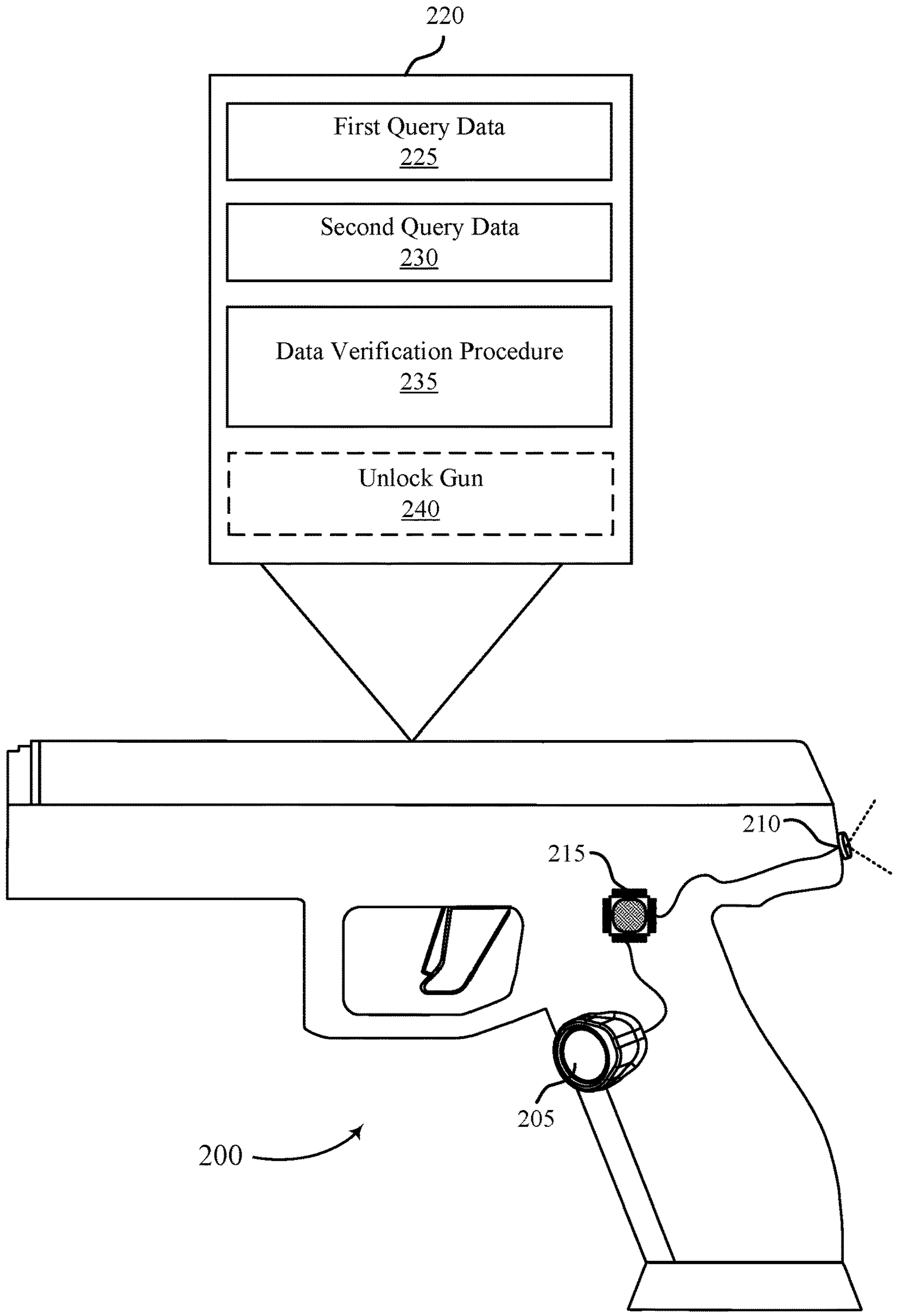
FIG. 2 illustrates an example of a gun that supports user authentication in accordance with aspects of the present disclosure.

FIG. 2 illustrates an example of a gun 200 that supports user authentication in accordance with aspects of the present disclosure. The gun 200 may be an aspect of the gun 100 as described with reference to FIG. 1. The gun 200 includes a fingerprint scanner 205, a camera 210, and an authentication manager 215. The authentication manager 215 may be electrically coupled with the fingerprint scanner 205 and the camera 210.

The authentication manager 215 is capable of implementing logical functions. For example, the authentication manager 215 may include a processor that executes instructions, memory cells that store data, and electrical circuits that carry electrical signals. The authentication manager 215 may perform aspects of an authentication procedure 220. For example, the authentication manager 215 may receive first query data including fingerprint data from the fingerprint scanner 205, and the authentication manager 215 may receive second query data including facial data from the camera 210.

The authentication manager 215 may perform the data verification procedure 235 based on receiving the first query data 225 or based on receiving the second query data 230. The data verification procedure 235 may determine whether received query data matches stored enrollment data. In some examples, the authentication manager 215 may determine that received query data matches enrollment data based on either the first query data 225 or the second query data 230 matching enrollment data, or the authentication manager 215 may determine that received query data matches enrollment data based on both the first query data 225 and the second query data 230 matching enrollment data.

As part of the data verification procedure 235, the authentication manager 215 may determine that query data matches enrollment data based on a similarity threshold, or the authentication manager 215 may determine that query data does not match enrollment data based on a dissimilarity threshold. The authentication manager 215 may compare the first query data 225 received from the fingerprint scanner 205 to enrolled fingerprint data to determine whether a first similar threshold is satisfied, and the authentication manager 215 may compare the second query data 230 received from the camera 210 to enrolled facial data to determine whether a second similar threshold is satisfied. The authentication manager 215 may determine that the user is authorized to operate the gun 200 based on the first query data 225 matching enrollment data, the second query data 230 matching enrollment data, or both the first query data 225 and the second query data 230 matching enrollment data.

In response to determining that the user is authorized to operate the gun 200, the authentication manager 215 may unlock the gun 200 at step 240. Unlocking the gun 200 may include removing an inhibitor mechanism (e.g., an electromechanical safety) or asserting a state change. As an example, authentication manager 215 may transmit a signal to an actuator of an inhibitor mechanism to activate the actuator such that the actuator disengages the inhibitor mechanism, and the gun 200 may fire a projectile based on disengaging the inhibitor mechanism. As another example, the authentication manager 215 may transmit a signal to an input/out (I/O) pin to assert an active state, and the gun 200 may fire a projectile based on the asserting of the active state. The authentication manager 215 may generate an output (e.g., a signal) based on query data matching enrollment data, and the output may indicate a successful match of the query data and enrollment data. Query data may be ephemeral data collected at a sensor of the gun 200, and a transformed version of enrollment data may be stored in non-volatile memory of the gun 200. In other words, the gun 200 may discard or refrain from storing query data, and the gun 200 may store enrollment data that has been transformed according to a data transformation procedure.

Figure 3:
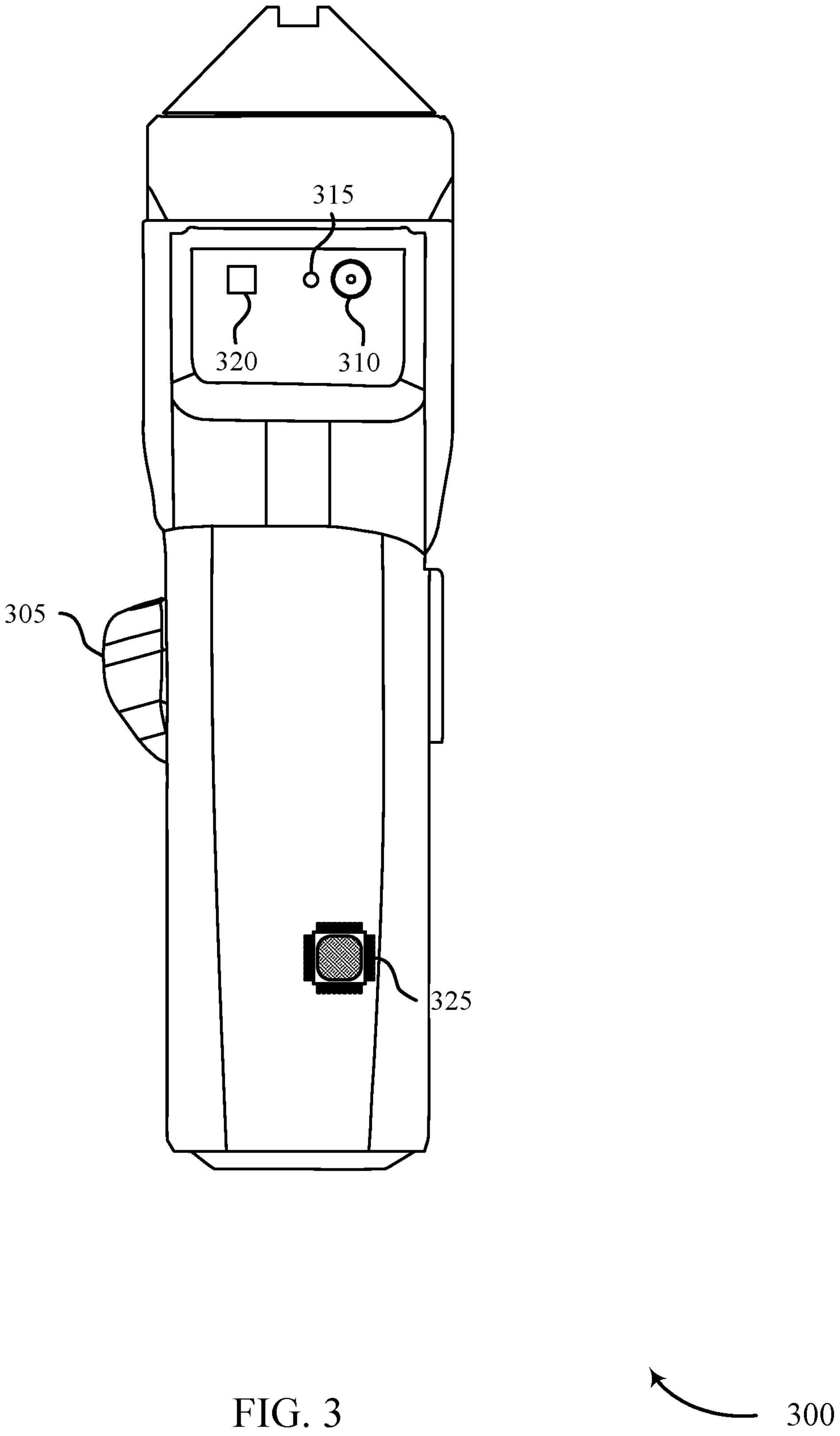
FIG. 3 illustrates an example of a gun that supports user authentication in accordance with aspects of the present disclosure.

FIG. 3 illustrates an example of a gun 300 that supports user authentication in accordance with aspects of the present disclosure. The gun 300 may be an aspect of the gun 100 as described with reference to FIG. 1 or the gun 200 as described with reference to FIG. 2. The gun 300 includes a fingerprint scanner 305, a facial recognition sensor 310, an illuminator 315, a dot projector 320, and a data receiver 325. The fingerprint scanner 305, the facial recognition sensor 310, and the receiver 325 are examples of authentication sensors that support collecting authentication data.

The fingerprint scanner 305 supports collecting fingerprint data for use in a user authentication procedure. The fingerprint scanner 305 may include an optical sensor, a capacitive sensor, or an ultrasonic sensor. For example, the fingerprint scanner 305 may include an optical image sensor that uses a complementarity metal-oxide semiconductor (CMOS) sensor and/or a charged coupled device (CCD) sensor, the fingerprint scanner 305 may include a capacitive sensor that uses an array of capacitors, or the fingerprint scanner 305 may include ultrasonic transmitters and receivers. The collected fingerprint data may be used in the user authentication procedure to verify the identity of the user.

The facial recognition sensor 310 supports collecting facial data for use in a user authentication procedure. The facial recognition sensor 310 may include an infrared camera or a visible light camera that supports collecting facial data from a user. Data obtained from the facial recognition sensor 310 may be used in a two-dimensional or three-dimensional facial recognition procedure. As an example of a three-dimensional facial recognition procedure, the illuminator 315 may include a flood illuminator (e.g., a light-emitting diode (LED)) configured to light up the face of the user, the dot projector 320 may include a laser projector (e.g., a vertical-cavity surface-emitting laser (VCSEL)) configured to project a dot matrix onto the face of the user to generate a depth map of the face, and the facial recognition sensor 310 may include an infrared CMOS sensor configured to generate an infrared image of the face of the user. The depth map and the infrared image may be used in the user authentication procedure to verify the identity of the user. Fingerprint data and facial data are examples of biometric authentication data which may be used in an authentication procedure, but it should be noted that other forms of biometric data may be used, such as palmprint data, vein pattern data, iris data, retina data, impedance data, heartbeat data, blood pressure data, electrocardiogram data (EKG), grip pressure data, voice data, thermography data, etc.

The receiver 325 supports collecting non-biometric data, such as token data, for use in a user authentication procedure. Unique digital data may be an example of token data, such as digital signature, Bluetooth data, NFC data, or RFID data. The receiver 325 may be an example of a RFID reader, an NFC reader, a Bluetooth reader, an antenna array, or the like. Token data is an example of non-biometric authentication data which may be used in a user authentication procedure.

The guns described herein may transition between various gun states, such as an authenticating state, an active state, and a sleep state. For example, the gun 300 may perform an authentication procedure while in the authenticating state, the gun 300 may fire a projectile or perform an enrollment procedure while in the active state, and the gun 300 may perform a system check while in the sleep state. In some cases, the gun 300 may power down a processor as part of transitioning to the sleep state. The gun 300 may enter the authenticating state in response to a user presence event, the gun 300 may enter the active state in response to a successful user authentication procedure, and the gun 300 may enter the sleep state in response to a user presence loss event. An example of a successful user authentication procedure is a user authentication procedure where it is determined that received query data matches stored enrollment data.

The gun 300 may enter the authenticating state in response to a user presence event, such as a user grasping or picking up the gun 300, and the gun 300 may identify the user presence event based on a sensor of the gun 300 activating. For example, the gun 300 may identify the user presence event in response to a photoelectric sensor generating an output indicating satisfaction of a configured threshold of the photoelectric sensor, or the gun 300 may identify the user presence event in response to an inertial measurement unit (IMU) generating an output indicating that data measured at the IMU matches a configured signature of the IMU, such as a signature of movement associated with a user picking up the gun 300. The gun 300 may enter the active state in response to a successful authentication procedure, such as a user authentication procedure indicating that received query data matches stored enrollment data. The gun 300 may enter the sleep state in response to a user presence loss event, such as a user releasing the gun. In some examples, the gun 300 may enter the sleep state in response to an unsuccessful authentication procedure, such as a user authentication procedure indicating that received query data does not match stored enrollment data.

In some examples, a user may configure the authentication procedure performed by the gun 300. For example, the user may configure the gun 300 to unlock in response to the authentication procedure matching two forms of biometric query data to enrollment data, the user may configure the gun 300 to unlock in response to the authentication procedure matching a form of biometric query data and a form of non-biometric query data (e.g., token data, such as an RFID tag) to enrollment data, the user may configure the gun 300 to unlock in response to the authentication procedure matching at least one form of biometric query data to enrollment data, or the user may configure the gun 300 to unlock in response to the authentication procedure matching at least one form of non-biometric query data to enrollment data. The user may configure the authentication procedure by providing user input via a display panel, such as a display panel of the gun 300, a display panel of a docking station (also referred to as a "dock") that is configured to be electrically coupled with the gun 300, or a display panel of a mobile device (e.g., a smartphone, a laptop, a tablet, etc.) that is configured to be electrically coupled with the gun 300. The user may provide biometric query data to the gun 300 and the gun may perform an authentication procedure to determine that the biometric query data matches enrollment data stored on the gun 300. In response to determining that the biometric query data matches the stored enrollment data, the gun 300 may allow the user to configure aspects of the authentication procedure. In other words, the gun 300 may allow a user to configure aspects of the authentication procedure based on determining that the user is authorized to operate the gun 300. In some examples, the gun 300 may allow the user to configure aspects of the gun 300 based on determining that the user is a primary user (e.g., an owner, a full-privileged user, etc.) of the gun 300

Figure 4:
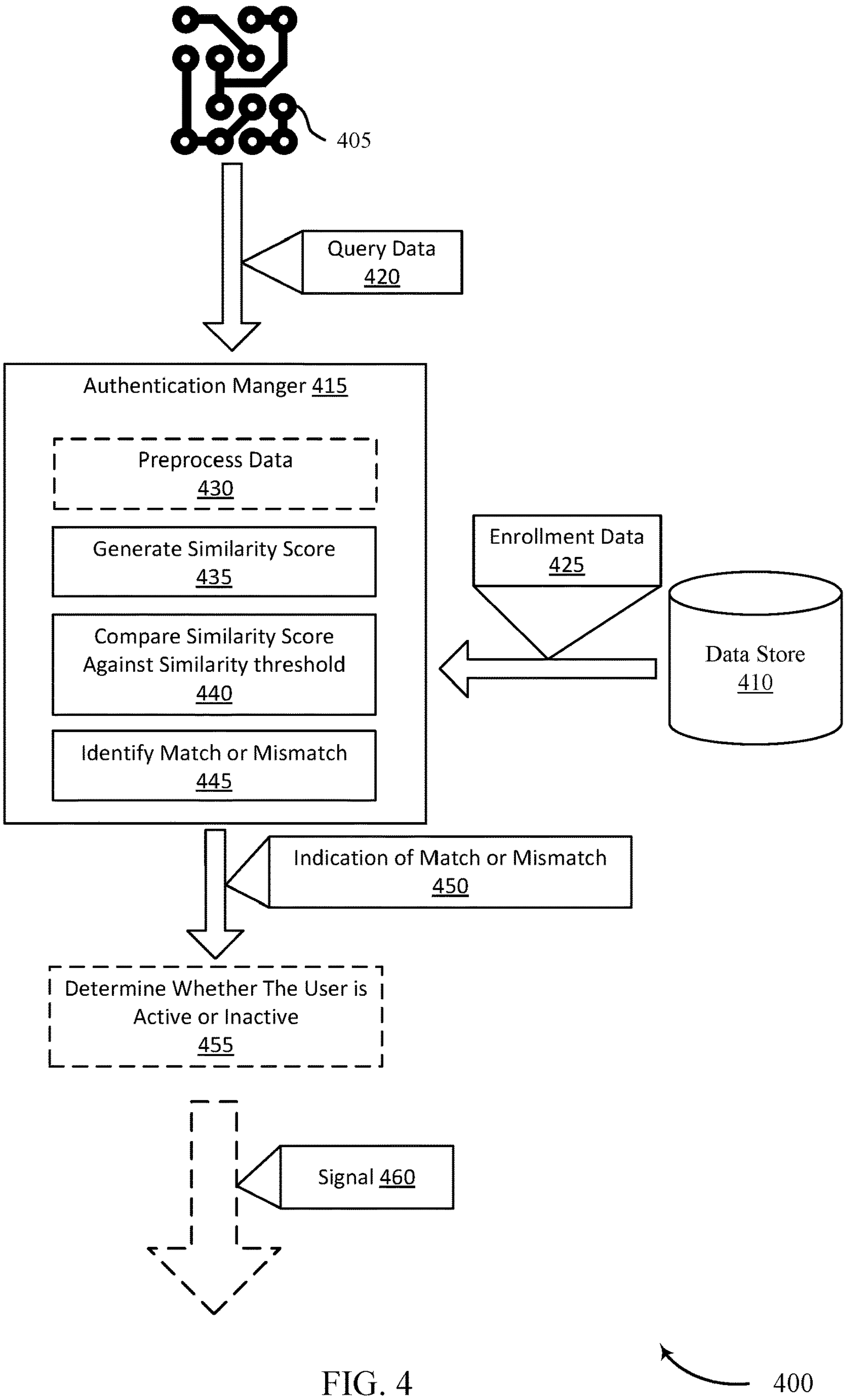
FIG. 4 illustrates an example of an authentication procedure that supports authenticating a user at a gun in accordance with aspects of the present disclosure.

FIG. 4 illustrates an example of an authentication procedure 400 that supports user authentication in accordance with aspects of the present disclosure. The authentication procedure 400 includes an authentication sensor 405, a data store 410, and an authentication manager 415. Aspects of the authentication procedure 400 may be implemented in a gun described herein. The authentication sensor 405 may be an example of a component that supports collecting authentication data, such as biometric data or a digital token. As an example, the authentication sensor 405 may be an example of a biometric sensor (e.g., a fingerprint sensor, a camera, an image sensor, an ultrasonic sensor, optical sensor, a capacitive sensor, an impedance sensor, etc.) or a token sensor (e.g., an RFID reader, an NFC reader, a Bluetooth reader, a wireless communication chip, an antenna, an antenna array, etc.). A token sensor may also be referred to as a non-biometric sensor.

The authentication manager 415 may be an example of, or include components of, a general-purpose processor, an application-specific integrated circuit (ASIC), a hardware security module (HSM), a microcontroller, or the like. The authentication manager 415 receives the query data 420 from the authentication sensor 405 and the enrollment data 425 from the data store 410. FIG. 4 illustrates the authentication manager 415 performing various steps as part of an authentication procedure, but it should be understood that the steps may be performed in a different order, additional steps may be added, or some steps may not be performed.

The query data 420 may include biometric data and/or non-biometric data. For example, the query data 420 may include fingerprint data, facial data, vein pattern data, iris data, impedance data, heart rate data, blood pressure data, EKG data, or grip pressure data, received from an image sensor, such as a fingerprint scanner or a camera. In some examples, the query data 420 may be preprocessed at step 430. Preprocessing the query data 420 may include grayscale transformation, normalization, segmentation, edge detection, orientation prediction, binarization, thinning, feature extraction, or any combination thereof. Preprocessing the query data 420 may improve the accuracy of the authentication procedure by reducing the noisiness of the data.

The authentication manager 415 may extract a set of features based on the query data 420, and the authentication manager 415 may determine the types of features to extract based on the type of the query data 420. For example, the query data 420 may be received from a fingerprint scanner and the authentication manager 415 may extract features based on ridge characteristics (also referred to as "minutiae"). In another example, the query data 420 may be received from a facial recognition camera and the authentication manager 415 may extract features based on facial characteristics, image texture, or Fisher vectors. In some examples, the features extracted from the query data 420 may be structured (e.g., such as when the features are based on minutiae or facial characteristics), while in other examples, the features extracted from the query data 420 may be unstructured (e.g., such as when the features are based on image texture or Fisher vectors).

As an illustrative example, the extracted features may include ridge characteristics (e.g., ridge endings, ridge bifurcations, ridge islands, ridge lakes, etc.), scars, pores, local binary patterns, histogram of gradients, speeder robust features, facial characteristics (e.g., mouth geometry, nose geometry, etc.), Fisher vectors, eigenvectors, image texture, features produced by Gabor wavelets, or the like. As another example, an artificial neural network (such as a convolutional neural network (CNN)) may extract features as part of a training procedure, and the features may be encoded in the artificial neural network as node weights. As another example, the query data 420 may be filtered as part of the preprocessing at step 430 to produce features. For example, Gabor filters (e.g., two dimensional Gabor filters, Ateb-Gabor filters, etc.) may be applied to the query data 420 to produce the set of features.

At step 435, the authentication manager 415 may generate a similarity score indicating the similarity between the query data 420 and the enrollment data 425. The query data 420 may include a set of query features and the enrollment data 425 may include a set of enrollment features. The similar score may be a normalized value between zero and one, where zero indicates the query data 420 and enrollment data 425 are dissimilar, and where one indicates the query data 420 and enrollment data 425 are similar. As an example, a distance (e.g., Euclidean distance, Manhattan distance, Mahalanobis distance, etc.) may be calculated between the query data 420 and the enrollment data 425, and the similarity score may be expressed by 1—distance. As another example, the similarity score may be generated by calculating the cosine similarity, the Dice similarity, the Jaccard similarity, or MinHash similarity of the query data 420 and the enrollment data 425. In some examples, a local similarity score may be calculated for each feature vector in the query data 420. In such examples, the similarity score indicting the similarity between the query data 420 and the enrollment data 425 may be referred to as a global similarity score, and the global similarity score be expressed as the average local similarity score, the median local similarity score, or $$\frac{2*m}{(q+e)},$$

where "m" is the number of feature matches, "q" is the number of query features in the query data, and "e" is the number of enrollment features in the enrollment data. As another example, the global similarity score may be expressed by $$\frac{2*m}{(qo+eo)}$$

where "m" is the number of feature matches, "qo" is the number of query features in the query data that are also present in the enrollment data, and "e" is the number of enrollment features in the enrollment data that are also present in the query data. As an illustrative example, a feature may be considered present in both the query data 420 and the enrollment data 425 based on the local similarity score for the feature being greater than a dynamic local similarity threshold, such as the average similarity score of the features present in the query data, or based on the local similarity score for the feature being greater than a predetermined local similarity threshold, such as .75, .8, .85, .9, .95, .98, .99, .995, .999, or .9999.

As another example, an artificial neural network may be used to generate a similarity score. The artificial neural network used to generate the similarity score may be an example of a regression model, a classification model, or a ranking model. An example of a ranking model is a Siamese model. The artificial neural network that generates the similarity score may be referred to as a similarity model. The similarity model may undergo a training procedure, where training data is fed into the similarity model, the model generates an output, and the weights of the model are updated based on the output. The weights of the model may be updated based on a backpropagation procedure that aids in calculating the gradient of the loss function with respect to the loss, and the weights may be adjusted according to a step size such that the loss is reduced. As an illustrative example, a feature extraction model (e.g., a CNN) may be used to extract query features from the query data 420 and the similarity model may (e.g., a Siamese model) may produce a similarity score for the query features with respect to the enrollment features from the enrollment data 425. In other words, a similarity model may take two sets of features as input and produce a similarity score as output. The input may include features extracted from the query data 420 and features extracted from the enrollment 425, and the output may correspond to a similarity score indicating the similarity of the two input feature sets or a distance between the two input feature sets.

At step 440, the authentication manager 415 may compare the similarity score against a similarity threshold. The authentication manager 415 may identify a match at step 445 based on the similarity score being greater than or equation to the similarity threshold, and the authentication manager 415 may identify a mismatch based on the similarity score being less than the similarity threshold. As an example, the authentication manager 415 may identify a match based on the similarity score satisfying a similarity threshold (e.g., the similarity score being greater than or equal to a similarity score of .97, .98, .99, .995, or .999), and the authentication manager 415 may identify a mismatch based on the similarity score satisfying a dissimilarity threshold (e.g., the similarity score being less than a similarity score of .97, .98, .99, .995, or .999).

At step 450, the authentication manager 415 may generate an indication of a match (e.g., a successful match) or an indication of a mismatch (e.g., an unsuccessful match). The authentication manager 415 may generate an indication of a mismatch based on the query data 420 not matching the enrollment data 425 (e.g., satisfying the dissimilarity threshold or not satisfying the similarity threshold). The indication of the mismatch may be generated when the received query data 420 does not match the enrollment data 425, such as when the query data 420 is collected from a user that has not been enrolled to operate the gun. The authentication manager 415 may generate an indication of a match based on the query data 420 matching the enrollment data 425 (e.g., or satisfying the similarity threshold). The indication of the match may be generated when the received query data 420 does match the enrollment data 425, such as when the query data 420 is collected from a user that has been enrolled to operate the gun.

In some examples, authentication manager 415 may determine whether the user is an active user or an inactive user. The authentication manager 415 may perform step 455 based on identifying a match at step 445 and/or generating an indication of the match at step 450. In some examples, a primary user (e.g., an owner) of the gun may allow a secondary user (e.g., an authorized user, a temporary user, or a guest user) to be enrolled on the gun, and the primary user may control whether the secondary user is active or inactive. For example, the primary user may configure the gun such that the user is authorized to operate the gun. As another example, the primary user may configure the gun such that the secondary user is a temporary user who is authorized to operate the gun for a duration of time (e.g., an hour, a day, a week, etc.). In other words, the primary user may configure the gun to allow an authorized user to operate the gun in response to the authorized user providing authentication data (e.g., fingerprint data, facial data, iris data, a Bluetooth token, an NFC token, etc.) to the gun, and the primary user may configure the gun to allow a temporary user to operate the gun in response to the temporary user providing authentication data within the duration of time. The gun may not allow the temporary user to operate the gun outside of the duration of time. For example, the primary user may configure the gun with a temporary user that is authorized to operate the gun for an hour, and the gun may allow the temporary user to operate the gun within the hour timeframe and not allow the temporary user to operate the gun outside of the hour timeframe. Allowing the creation of secondary users improves gun safety and user experience, as a primary user may configure the gun to allow a secondary user, such as a friend or a child, to operate the gun for a duration of time and automatically prevent the secondary user from operating the gun after the duration of time. Additionally, the primary user may use a display panel to toggle the secondary user as active as inactive without the secondary user having to re-enroll biometric data at the gun.

A primary user may configure the gun by providing input to the gun via a display panel of the gun, a display panel of a docking station (also referred to as a "dock") or an application, such as a web application, a desktop application, or a mobile application. The primary user may provide user input, such as a selection of a "Create new user" button on the display panel, to generate a secondary user. As part of configuring the gun to authorize a secondary user to operate the gun, the primary user may perform an authentication procedure. In response to successfully authenticating the primary user, the gun may generate a prompt for authentication data from the secondary user. The prompt may be a prompt for biometric data, token data, or both. For example, the display panel may show a text message prompting the secondary user to place a finger on a fingerprint scanner, enter the field of view of a camera, move an RFID tag close to the gun, select an option within an associated mobile application, or the like. In response to receiving the authentication data, the gun may create a user account for the secondary user and store the authentication data (e.g., enrollment data, such as transformed biometric data or encrypted token data) in memory of the gun. As part of a user authentication procedure, the gun may receive query data from the secondary user, identify a data match based on the received query data matching stored enrollment data, identify an active status of the secondary user, and transition to an active state (e.g., an unlocked state) in response to identifying the data match and identifying the active status of the secondary user. The active status of the secondary user may be identified based on a data flag, such as a Boolean value stored in memory, indicating an active status for the secondary user.

The authentication manager 415 may transit a signal 460 based on identifying a match at step 445, based on generating an indication of the match at step 450, based on determining that the user is an active user at step 455, or any combination thereof. As an example, the authentication manager 415 may transmit the signal 460 in response to identifying a match at step 445. As another example, the authentication manager 415 may transmit the signal 460 in response to identifying a match at step 445 and determining that the user is an active user at step 455.

Figure 5:
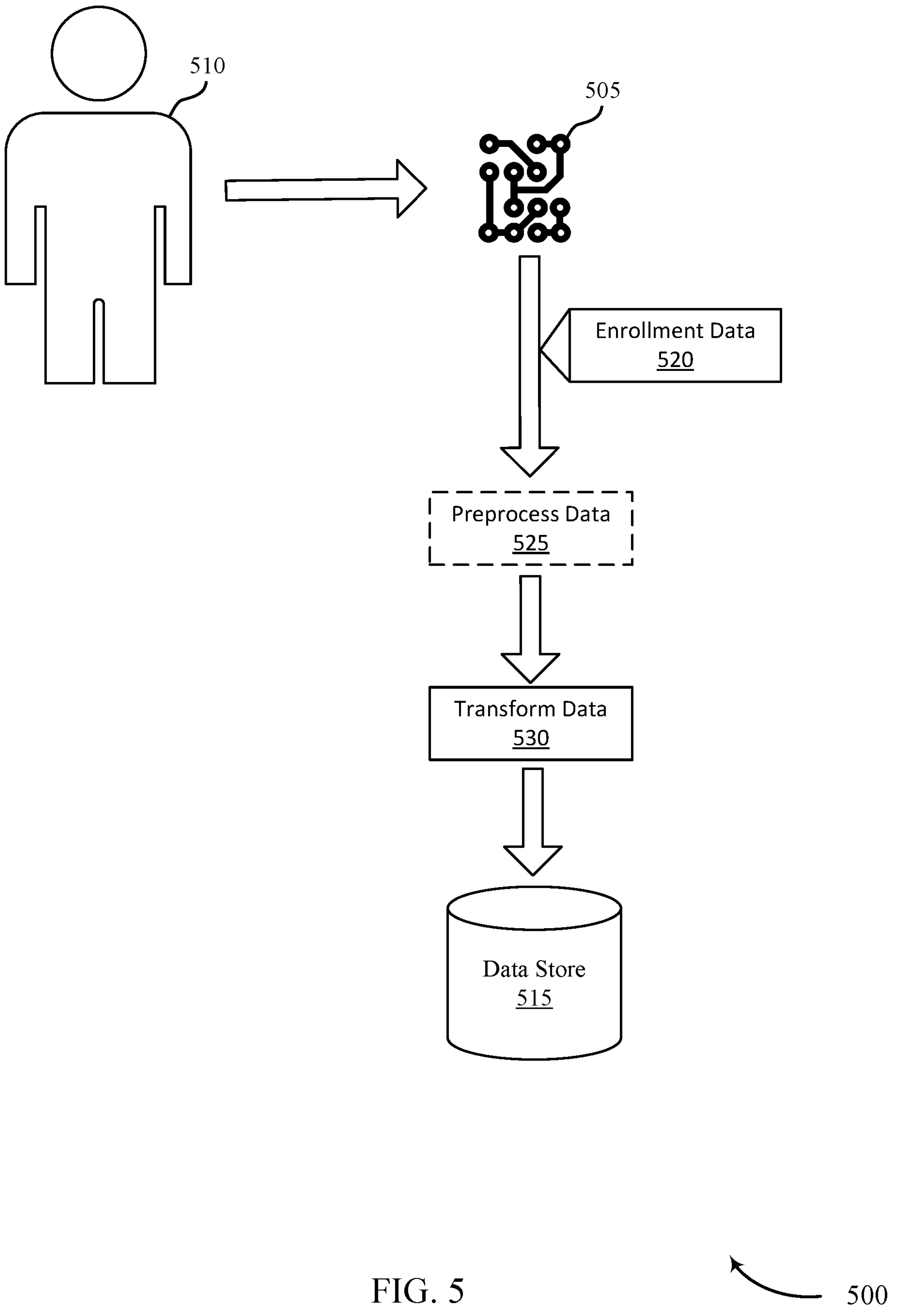
FIG. 5 illustrates an example of an enrollment procedure that supports enrolling a user at a gun in accordance with aspects of the present disclosure.

FIG. 5 illustrates an example of an enrollment procedure 500 that supports user authentication in accordance with aspects of the present disclosure. The enrollment procedure 500 illustrates an authentication sensor 505, a user 510, and data store 515. Aspects of the enrollment procedure 500 may be implemented in a gun described herein.

The authentication sensor 505 may collect the enrollment data 520 (e.g., authentication data) from the user 510, and the enrollment data 520 may be stored in the data store 515. In some examples, the enrollment data 520 may include non-biometric authentication data, while in some additional or alternative examples, the enrollment data 520 may include biometric data.

At step 525, the enrollment data 520 may be preprocessed. As an example, the enrollment data 520 may include non-biometric enrollment data (e.g., RFID data, Bluetooth data, NFC data, etc.), and the gun (or a component thereof, such as an authentication manager) may apply error correcting codes to the enrollment data 520 at step 525. As another example, the enrollment data 520 may include biometric enrollment data (e.g., fingerprint data, facial data, vein pattern data, iris data, EKG data, etc.), and the gun may perform binarization, segmentation, or feature extraction on the enrollment data 520 at step 525. Preprocessing the enrollment data 520 may improve the quality of the data. As an illustrative example, the enrollment data 520 may include fingerprint data, and the preprocessing of the fingerprint data may include binarizing (e.g., thresholding) the fingerprint data and extracting a set of features (e.g., minutiae data) from the binarized fingerprint data. As another example, the enrollment data 520 may include facial data, and the preprocessing of the facial data may include detecting a face and segmenting the face. In some cases, preprocessing the enrollment data 520 may include extracting a set of features, and the set of features may be extracted according to local binary patterns, Fisher vectors, a principal component analysis, a Histogram of Gradient, Bag of Words, or the like. For example, the set of features may be extracted from the enrollment data 520 by performing Fisher discriminant analysis on the enrollment data 520.

The enrollment data 520 may be transformed (e.g., hashed, encrypted, encoded) at step 530, and the transformed data may be stored in the data store 515, thereby improving data security and user privacy. The enrollment data 520 may be transformed based on a transformation key (or simply "key"). A key may be an example of a cryptographic key, a projection matrix, or a coordinate shifting key. As an example, non-biometric data may be transformed according to an encryption procedure (e.g., a symmetric encryption procedure or an asymmetric encryption procedure) that uses a cryptographic key, and biometric data may be transformed according to a one-way function that uses a projection matrix. The enrollment data 520 may be transformed according to a hashing scheme (e.g., Biohash, Palmhash, etc.), an encryption scheme (e.g., as described with refence to FIG. 6), a cancellable biometric scheme (e.g., as described with refence to FIG. 7), a biometric cryptosystem (e.g., as described with refence to FIG. 8), or hybrid a scheme (e.g., a combination of a hashing scheme and a biometric cryptosystem).

Figure 6:
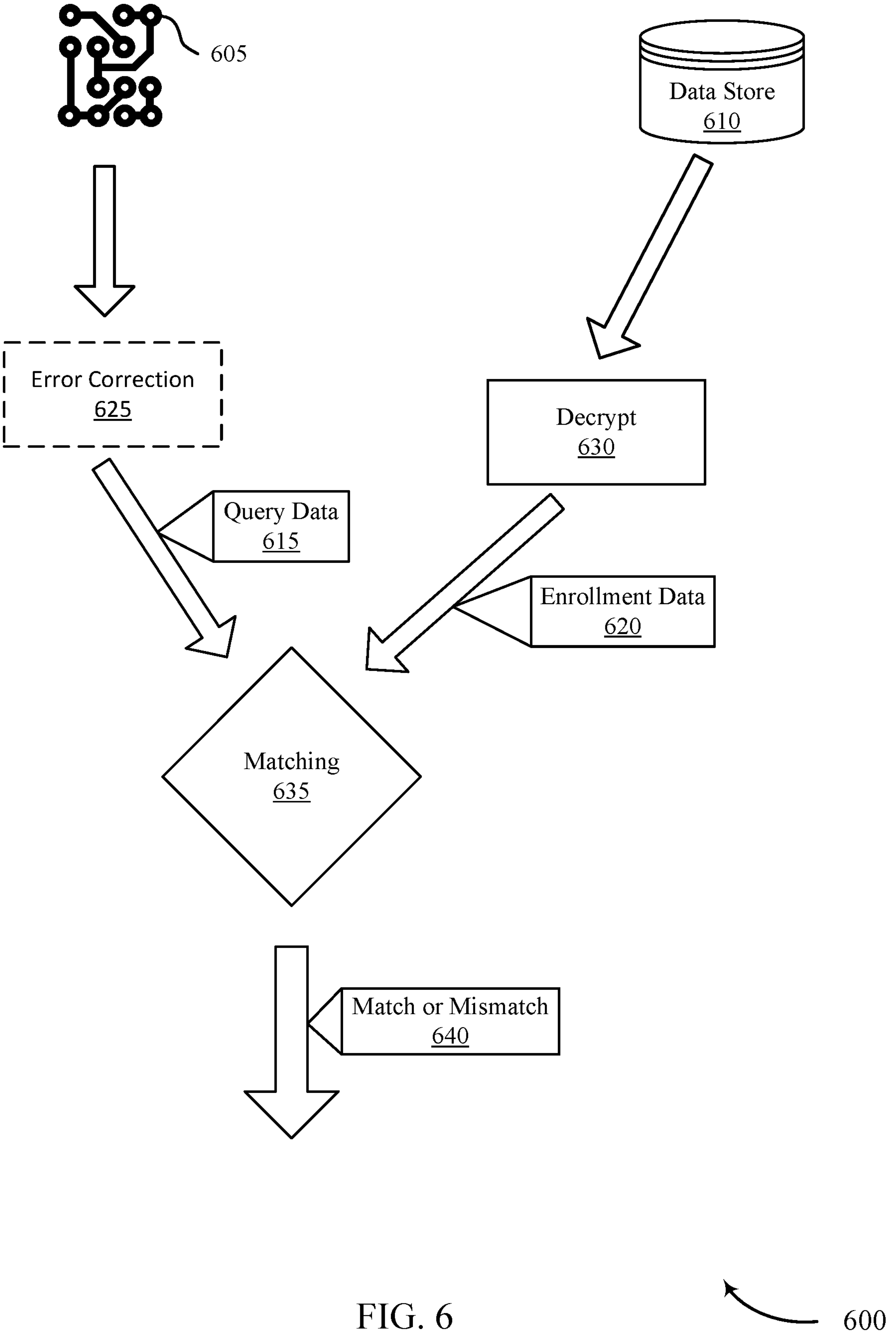
FIG. 6 illustrates an example of a data transformation procedure that supports user authentication in accordance with aspects of the present disclosure.

FIG. 6 illustrates an example of a data transformation procedure 600 that supports user authentication in accordance with aspects of the present disclosure. Aspects of the data transformation procedure 600 may be implemented in a gun described herein. The data transformation procedure 600 includes an error correcting operation that produces the query data 615. The error correcting operation may be performed based on authentication data received at the authentication sensor 605. The authentication data may be referred to as query data when collected as part of a user authentication procedure, and the authentication data may be referred to as enrollment data when collected as part of a user enrollment procedure. Additionally, the gun may store enrollment data (or a transferred version of the enrollment data) in non-volatile memory, and the gun may refrain from storing authentication data in non-volatile memory.

The data transformation procedure 600 includes an authentication sensor 605 and a data store 610. The data transformation procedure 600 may be performed on non-biometric authentication data, such as token data. For example, the query data 615 and the enrollment data 620 may be examples of token data, such as RFID data, Bluetooth data, NFC data, or the like. As an example, the query data 615 may include token data, such as RFID data or NFC data received from a device tag, such as an RFID tag or an NFC tag. The tag may be an example of a passive tag or an active tag (e.g., a battery-powered tag). The tag may, in some cases, include a secure element, such as a subscriber identify module (SIM) card, a universal integrated circuit card (UICC), an embedded microprocessor, or the like. The tag may be embedded in a ring worn by a user of the gun, embedded in a bracelet worn by the user, embedded in an article of clothing worn by the user, embedded in a badge carried by the user, held on the person of the user, or embedded under the skin of the user. For example, some users may choose to embed the tag under the skin of a hand, and other users may choose to embed the tag in a glove or a shirt. In either example, the gun may be activated in response to the tag coming within a threshold distance of the authentication sensor 605. The threshold distance may be based on the authentication sensor 605 and/or the tag. For example, the threshold distance may be ½ an inch, 12 inches, or anywhere in between for a passive tag, and the threshold distance may be ½ an inch, 100 yards, or anywhere in between for an active tag.

The gun may perform a handshake procedure to verify the that the token data is received from a trusted source. For example, the authentication sensor 605 (e.g., a microcontroller, an RFID reader, an NFC reader, etc.) may generate a radiofrequency wave, a passive tag may enter the field of the radiofrequency wave and receive energy from the radiofrequency wave such that the tag can clock data to an output transistor to sequentially shunt a coil in response to the data being clocked to the output transistor. The data being clocked may represent a digital signature of the tag, and the shunting of the coil can result in fluctuation of the radiofrequency wave in a manner that represents the digital signature. The authentication sensor 605 may identify the fluctuations of the radiofrequency wave, process the bitstream associated with the fluctuations, and determine whether the bitstream corresponds to a digital signature (e.g., a token) of an authorized device.

In some examples, the enrollment data 620 may be encrypted according to an encryption scheme before being stored in the data store 610. For example, the enrollment data 620 may be encrypted according to an encryption procedure, such as Advanced Encryption Standard (AES) encryption, Rivest-Shamir-Adleman (RSA) encryption, fully homomorphic encryption, partially homomorphic encryption, or the like. As an example, the enrollment data 620 may be encrypted based on a cryptographic key, and the cryptographic key may be split up and stored separately on the gun. The cryptographic key may be derived based on entropy data collected at the gun, based on a key-derivation function, as part of a key-deriving biometric cryptosystem, or any combination thereof.

The query data 615 may be collected at the authentication sensor 605, which may be an example of an electronic component configured to receive authentication data, such as an RFID reader, an NFC reader, a Bluetooth reader, an antenna, a passive electronically scanned array, an active electronically scanned array, a hybrid beam forming phased array, a digital beam forming array, or the like.

An authentication manager may receive a signal and process the signal to obtain the query data 615 from the authentication sensor 605. For example, the signal may be received as part of an RFID protocol, an NFC protocol, a Bluetooth protocol, a Wi-Fi, protocol, or the like, and the signal may be processed to obtain the query data 615. At step 625, an error correcting operation may be performed on the signal. For example, the authentication manager may apply error correction codes to the signal to reduce the noisiness of the data.

The authentication manager may retrieve data from the data store 610, and the authentication manager may decrypt the data at step 630 to obtain the enrollment data 620. For example, the authentication manager may retrieve a cryptographic key (or simply "key") and decrypt the data with the key to obtain the enrollment data 620. The key may be a symmetric cryptographic key in some examples, and the key may be an asymmetric cryptographic key in other examples.

At step 635, the authentication manager may perform a matching operating to determine whether the query data 615 matches the enrollment data 620. In some examples, the authentication manager may determine that the query data 615 matches the enrollment data 620 based on a similarity threshold being satisfied. As an example, the query data 615 and the enrollment data 620 may correspond to non-biometric data, and the similarity threshold may be satisfied based on the query data 615 and the enrollment data 620 both corresponding to the same digital data value. In other words, the similarity threshold may be satisfied based on the query data 615 being the same as the enrollment data 620. As another example, the query data 615 and the enrollment data 620 may correspond to biometric data, and the similarity threshold may be satisfied based on the query data 615 and the enrollment data 620 achieving a similarity score of at least .95, .98, .99, .995, .999, or .9999.

At step 640, the authentication manager may generate an indication of a match, or the authentication manager may generate an indication of mismatch. The indication of the match or mismatch may include a data value written to memory, a signal transmitted to an I/O pin, a signal transmitted to an inhibitor mechanism, or a signal transmitted to an actuator mechanism. In some examples, the authentication manager may refrain from generating the signal based on identifying a mismatch.

Figure 7:
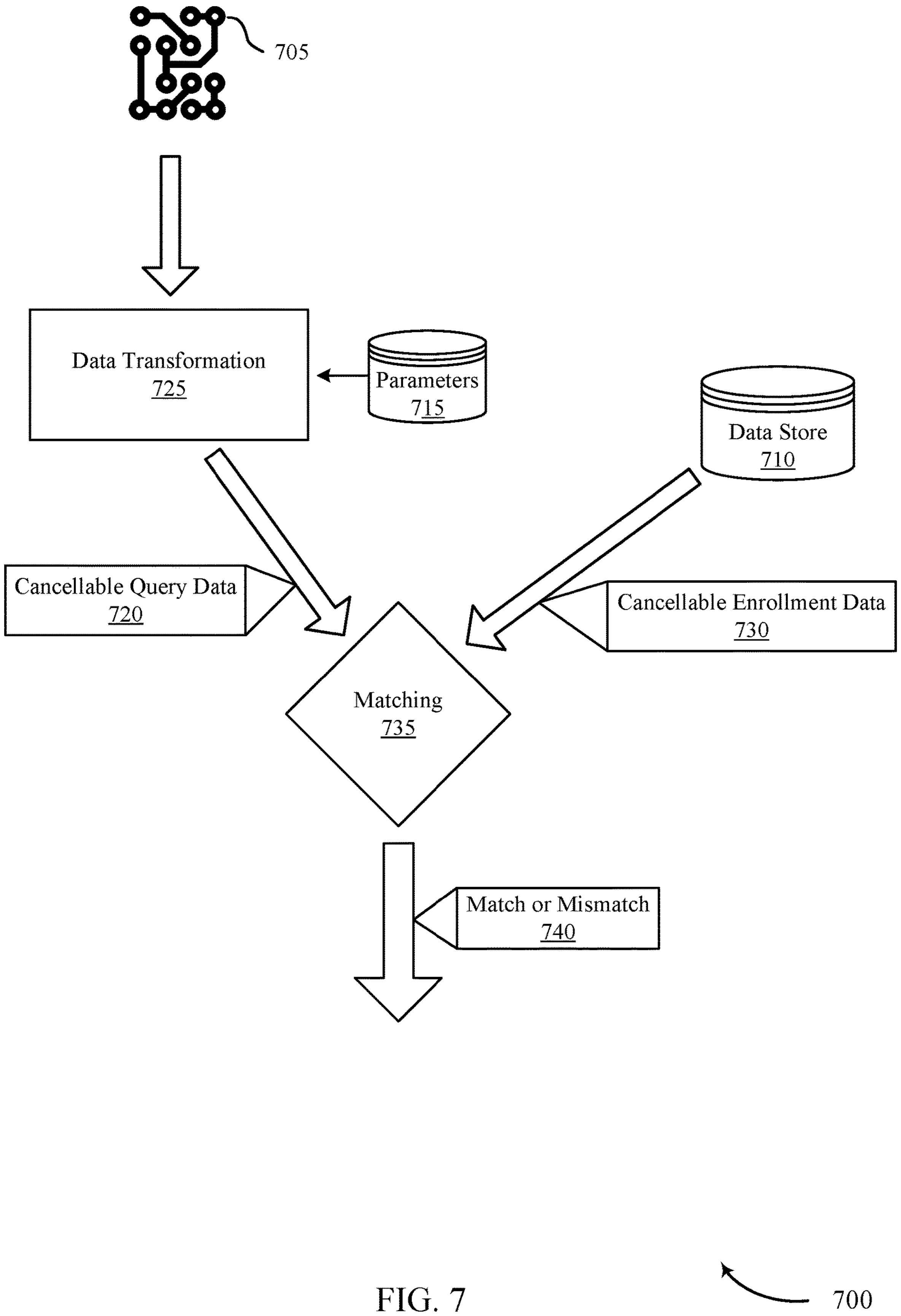
FIG. 7 illustrates an example of a data transformation procedure that supports user authentication in accordance with aspects of the present disclosure.

FIG. 7 illustrates an example of a data transformation procedure 700 that supports user authentication in accordance with aspects of the present disclosure. The data transformation procedure 700 may be performed at a gun described herein. The data transformation procedure 700 includes an authentication sensor 705 and a data store 710. An authentication manager may receive authentication data, such as biometric authentication data, from the authentication sensor 705.

The data transformation procedure 700 includes a data transformation operation at step 725 that produces cancellable query data 720. The data transformation may be performed based on authentication data received at the authentication sensor 705. The authentication data may be referred to as query data when collected as part of a user authentication procedure, and the authentication data may be referred to as enrollment data when collected as part of a user enrollment procedure. Additionally, the gun may store enrollment data (or a transferred version of the enrollment data) in non-volatile memory, and the gun may refrain from storing authentication data in non-volatile memory.

At step 725, the authentication manager may perform a data transformation based on the authentication data and the parameters 715 to produce the cancellable query data 720. The parameters 715 may include a transformation key, such as a random projection matrix, a coordinate shifting key, or a pseudo-random number. Performing the data transformation may include performing a non-invertible operation. As an example, the authentication manager may transform authentication data in the signal domain according to a non-invertible function, such as dimensionality reduction transformation, to produce the cancellable query data 720. As another example, the authentication manager may transform the authentication data in the feature domain according to a non-invertible function, such as a random projection transformation or a coordinate shifting transformation, to produce the cancellable query data 720. Performing the data transformation may include performing a biometric salting operation. As an example, the authentication manager may transform authentication data in according to salting function, such as a biohashing transformation or a multistage random projection transformation, such as dimensionality reduction transformation, to produce the cancellable query data 720.

The authentication manager may retrieve the cancellable enrollment data 730 and perform a matching operation at step 735. The matching operation may determine whether the cancellable query data 720 matches the cancellable enrollment data 730. As an example, the authentication manager may generate a similarity score indicating the similarity of the cancellable query data 720 and the cancellable enrollment data 730, compare the similarity score against a similarity threshold, determine that the cancellable query data 720 matches the cancellable enrollment data 730 based on the similarity score satisfying the similarity threshold, and generate an indication of a match in response to the similarity score satisfying the similarity threshold.

The indication of the match or mismatch may be generated at step 740. The indication of the match or mismatch may include a data value written to memory, a signal transmitted to an I/O pin, a signal transmitted to an inhibitor mechanism, or a signal transmitted to an actuator mechanism. For example, the authentication manager may transmit a signal to a general purpose I/O (GPIO) pin in response to determining that the cancellable query data 720 matches the cancellable enrollment data 730, and the gun may enter an active (e.g., unlocked) state in response to transmitting the signal.

Figure 8:
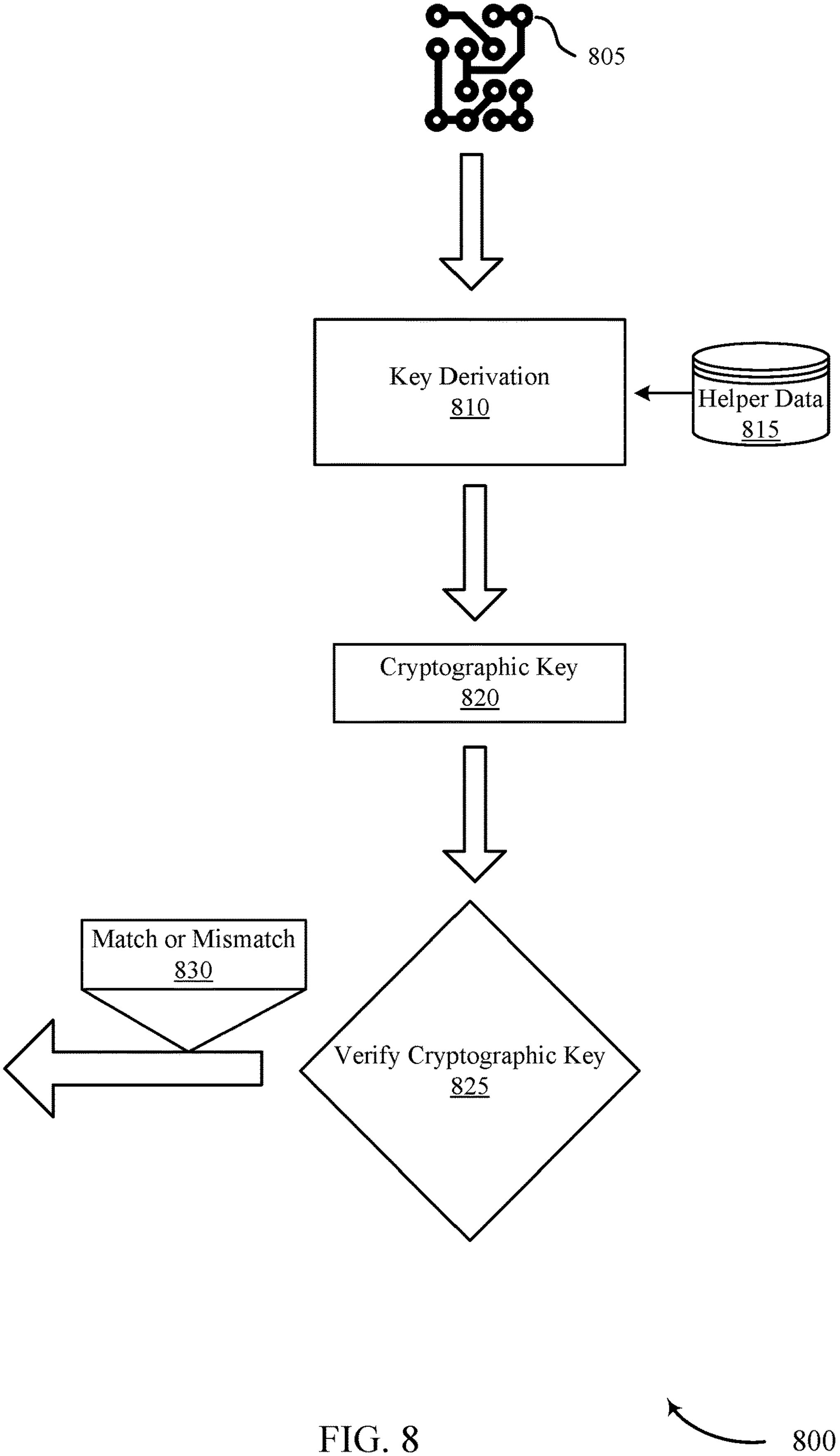
FIG. 8 illustrates an example of a data transformation procedure that supports user authentication accordance with aspects of the present disclosure.

FIG. 8 illustrates an example of a data transformation procedure 800 that supports user authentication in accordance with aspects of the present disclosure. The data transformation procedure 800 may be performed at a gun as described herein. The data transformation procedure 800 includes an authentication sensor 805. An authentication manager may receive authentication data, such as biometric authentication data, from the authentication sensor 805.

The data transformation procedure 800 includes a key derivation operation that produces a cryptographic key 820. The key derivation operation may be performed based on authentication data received at the authentication sensor 805. The authentication data may be referred to as query data when collected as part of a user authentication procedure, and the authentication data may be referred to as enrollment data when collected as part of a user enrollment procedure. Additionally, the gun may store enrollment data (or a transferred version of the enrollment data) in non-volatile memory, and the gun may refrain from storing authentication data in non-volatile memory.

At step 810, the authentication manager may perform a key derivation operation based on the authentication data and the helper data 815 to produce the cryptographic key 820. Performing the key derivation operation may include performing a key-binding operation. As an example, the authentication manager may transform authentication data according to a fuzzy commitment scheme, a fuzzy vault, or a shielding function to produce the cryptographic key 820. Performing the key derivation operation may include performing a key-generation operation. As an example, the authentication manager may transform the authentication data according to a private template scheme or a quantization scheme to produce the cryptographic key 820.

At step 825, the authentication manager may verify the cryptographic key 820 to determine whether the authentication data corresponds to valid user. An example of a valid user is a user that has performed an enrollment procedure to enroll biometric data on the gun. The authentication manager may verify the cryptographic key 820 by successfully decrypting ciphertext into plaintext or by generating a hash value and determining that the generated hash value matches a stored hash value. For example, the authentication manager may verify the cryptographic key 820 by using the cryptographic key 820 to confirm a cryptographic signature, decrypt ciphertext into plaintext, or generate a hash value which is compared against a stored hash value.

The authentication manager may generate an indication of a match or mismatch at step 830. For example, the authentication manager may generate an indication of a match based on the verifying of the cryptographic key 820, and the authentication manager may generate an indication of a mismatch based on invalidating the cryptographic key 820. In some cases, the authentication manager may refrain from transmitting a signal based on determining that the cryptographic key 820 is invalid. As an example, the authentication manager may determine that the cryptographic key 820 is valid in response to confirming a cryptographic signature with the cryptographic key 820, and the authentication manager may determine that the cryptographic key 820 is invalid in response to failing to confirm a cryptographic signature with the cryptographic key 820. As another example, the authentication manager may determine that the cryptographic key 820 is valid in response to generating a hash value by using the cryptographic key 820 as input to a hash function and comparing the output of the hash function against a predetermined hash value. The authentication manager may determine that the cryptographic key 820 is valid based on the generated hash value and the predetermined hash value satisfying a similarity threshold corresponding to a digital match. In other words, the authentication manager may determine that the cryptographic key 820 is valid based on the generated hash value being the same as the predetermined hash value, and the authentication manager may determine that the cryptographic key 820 is invalid based on the generated hash value differing from the predetermined hash value. The predetermined hash value may be generated as part of a user enrollment procedure. A match may be identified in response to determining that the cryptographic key 820 is valid, and a mismatch may be identified in response to determine that the cryptographic key 820 is invalid.

Figure 9:
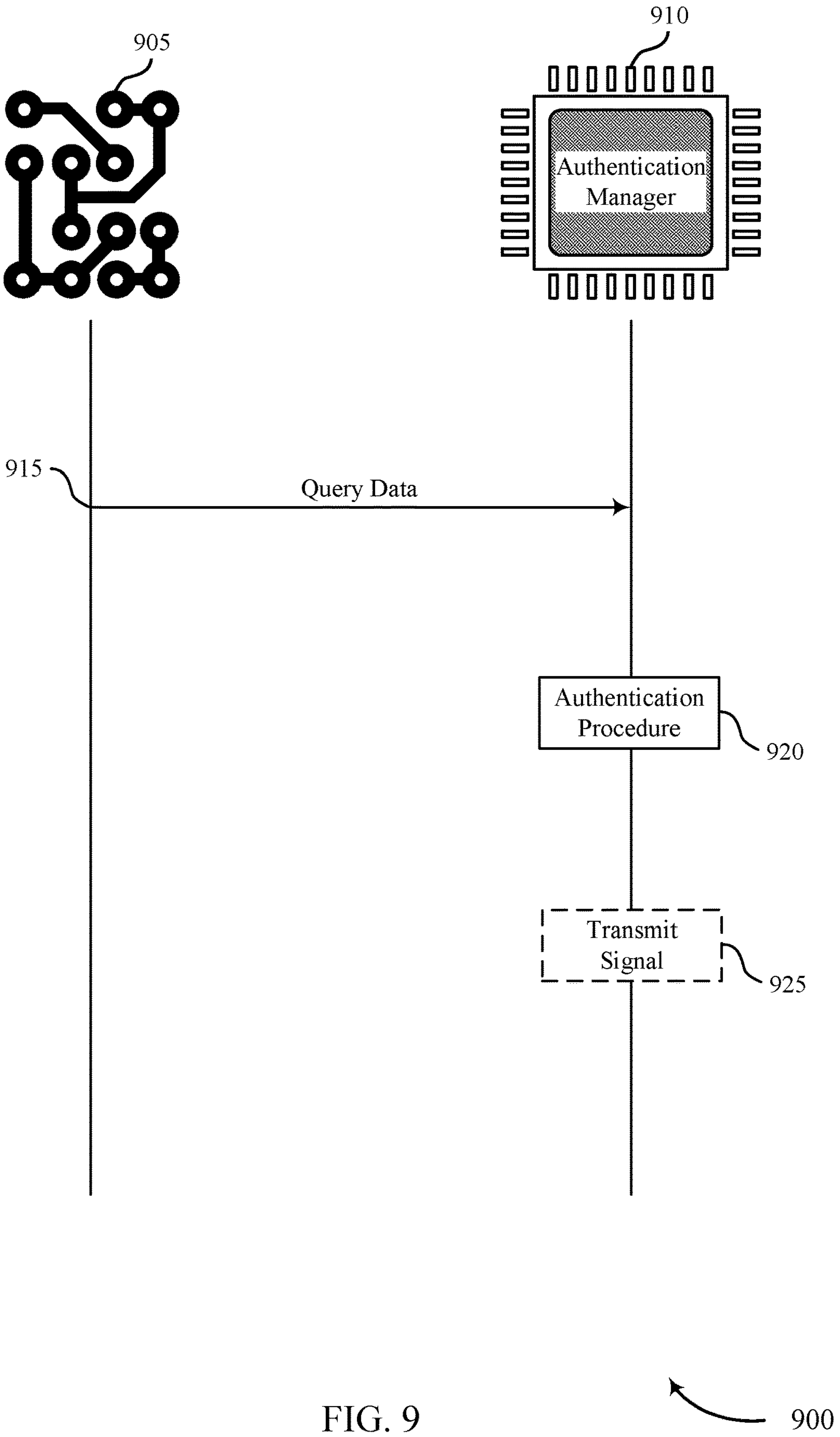
FIG. 9 illustrates an example of a process flow that supports user authentication in accordance with aspects of the present disclosure.

FIG. 9 illustrates an example of a process flow 900 that supports user authentication in accordance with aspects of the present disclosure. The process flow 900 includes an authentication sensor 905 and an authentication manager 910, which may be examples of the corresponding components described with reference to FIGS. 1 through 8. Alternative examples of the following may be implemented, where some steps are performed in a different order than described or are not performed at all. In some cases, steps may include additional features not mentioned below, or further steps may be added.

At step 915, the authentication manager 910 may receive query data from the authentication sensor 905. Query data may be an example of authentication data that is received from the authentication sensor 905 as part of a user authentication procedure. The query data may include biometric data, such as fingerprint data, palm print data, vein pattern data, facial data, or iris data. The query data may additionally or alternatively include non-biometric data, such as token data, which may include digital data received as part of a Bluetooth protocol, an RFID protocol, or an NFC protocol. In other words, the query data may include biometric data, non-biometric data, or both.

At step 920, the authentication manager 910 may perform an authentication procedure to determine whether the query data matches enrollment data. The authentication manager 910 may retrieve the enrollment data from non-volatile memory. In some examples, the authentication manager 910 may generate a similarity score indicating a level of similarity between the query data and the enrollment data. For example, the authentication manager 910 may calculate a normalized Euclidean distance between the query data and the enrollment data, and the authentication manager 910 may generate the similarity score by subtracting the normalized Euclidean distance from 1. As another example, the authentication manager 910 may generate the similarity score by calculating the Dice coefficient or the Jaccard coefficient for the query data and enrollment data. The authentication manager 910 may identify a match based on the similarity score satisfying a similarity threshold. A match may be identified when the query data is the same as, or substantially the same as, enrollment data stored at the gun. In other words, a match indicates that the query data corresponds to a user who has been enrolled to use the gun. Query data may be substantially the same as enrollment data when the similarity score satisfies the similarity threshold. Satisfying the similarity threshold may correspond to a similarity score that is greater than or equal to .95, .96, .97, .98, .99, .995, .999, or .9999.

At step 925, the authentication manager 910 may transmit a signal in response to identifying a match. In some examples, the authentication manager 910 may transmit the signal in response to determining that the similarity score satisfies the similarity threshold. As an example, the authentication manager 910 may transmit the signal to a GPIO pin, and the gun may transition to an unlocked state (e.g., an active state) in response to the signal. As another example, the authentication manager 910 may transmit the signal to an electromechanical safety, and the electromechanical safety may be disengaged in response to transmitting the signal. As another example, the authentication manager 910 may transmit the signal to an actuator mechanism retaining a firing pin, a sear, a hammer, or a striker, and the firing pin, scar, hammer, or striker may be released in response to transmitting the signal. Releasing the firing pin, sear, hammer, or striker may cause the ignition of a propellent and the firing of a projectile from the gun.

Figure 10:
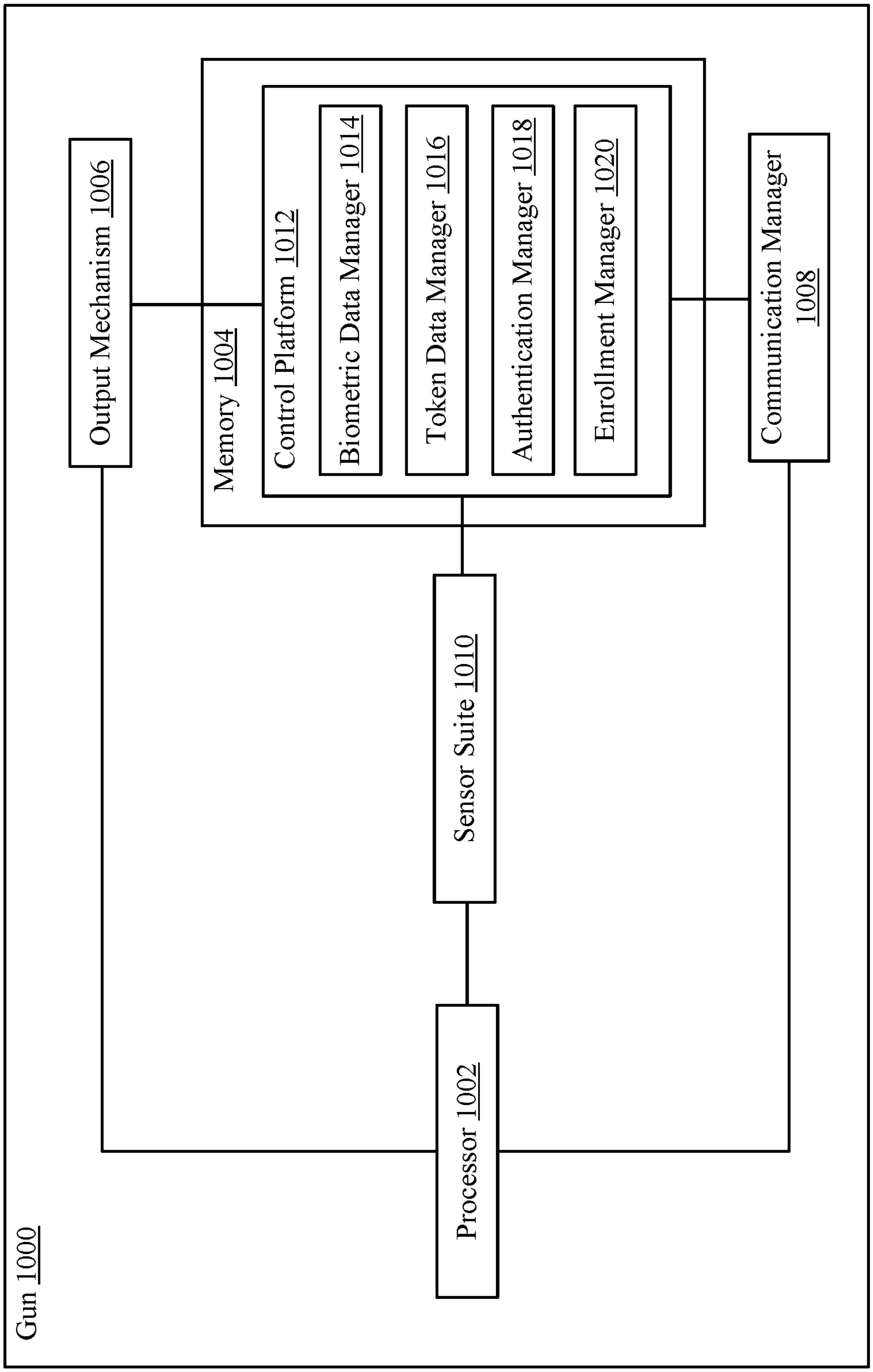
FIG. 10 illustrates an example of a gun that supports user authentication in accordance with aspects of the present disclosure.

FIG. 10 illustrates an example of a gun 1000 able to implement a control platform 1012 designed to produce outputs that are helpful in ensuring the gun 1000 is used in an appropriate manner. As further discussed below, the control platform 1012 (also referred to as a "management platform" or "authentication manager") may be designed to receive biometric data from a user, authenticate the user based on the biometric data, or transition the gun into a state, such as an unlocked state or a locked state.

In some embodiments, the control platform 1012 is embodied as a computer program that is executed by the gun 1000. In other embodiments, the control platform 1012 is embodied as an electrical circuit that performs logical operations of the gun 1000. In yet other embodiments, the control platform 1012 is embodied as a computer program that is executed by a computing device to which the gun 1000 is communicatively connected. In such embodiments, the gun 1000 may transmit relevant information to the computing device for processing as further discussed below. Those skilled in the art will recognize that aspects of the computer program could also be distributed amongst the gun 1000 and computing device.

The gun 1000 can include a processor 1002, memory 1004, output mechanism 1006, and communication manager 1008. The processor 1002 can have generic characteristics similar to general-purpose processors, or the processor 1002 may be an application-specific integrated circuit (ASIC) that provides control functions to the gun 1000. As shown in FIG. 10, the processor 1002 can be coupled with all components of the gun 1000, either directly or indirectly, for communication purposes.

The memory 1004 may be comprised of any suitable type of storage medium, such as static random-access memory (SRAM), dynamic random-access memory (DRAM), electrically erasable programmable read-only memory (EEPROM), flash memory, or registers. In addition to storing instructions that can be executed by the processor 1002, the memory 1004 can also store data generated by the processor 1002 (e.g., when executing the managers of the control platform 1012). Note that the memory 1004 is merely an abstract representation of a storage environment. The memory 1004 could be comprised of actual memory chips, registers, managers, or electrical circuits.

The output mechanism 1006 can be any component that is capable of conveying information to a user of the gun 1000. For example, the output mechanism 1006 may be a display panel (or simply "display") that includes LEDs, organic LEDs, liquid crystal elements, or electrophoretic elements. Alternatively, the display may simply be a series of illuminants (e.g., LEDs) that are able to indicate the status of the gun 1000. Thus, the display may indicate whether the gun 1000 is presently in a locked state, unlocked state, etc. As another example, the output mechanism 1006 may be a loudspeaker (or simply "speaker") that is able to audibly convey information to the user.

The communication manager 1008 may be responsible for managing communications between the components of the gun 1000. Additionally or alternatively, the communication manager 1008 may be responsible for managing communications with computing devices that are external to the gun 1000. Examples of computing devices include mobile phones, tablet computers, wearable electronic devices (e.g., fitness trackers), and network-accessible server systems comprised of computer servers. Accordingly, the communication manager 1008 may be wireless communication circuitry that is able to establish communication channels with computing devices. Examples of wireless communication circuitry include integrated circuits (also referred to as "chips") configured for Bluetooth®, Wi-Fi®, Near Field Communication (NFC), and the like.

Sensors are normally implemented in the gun 1000. Collectively, these sensors may be referred to as the "sensor suite" 1010 of the gun 1000. For example, the gun 1000 may include a motion sensor whose output is indicative of motion of the gun 1000 as a whole. Examples of motion sensors include multi-axis accelerometers and gyroscopes. As another example, the gun 1000 may include a proximity sensor whose output is indicative of proximity of the gun 1000 to a nearest obstruction within the field of view of the proximity sensor. A proximity sensor may include, for example, an emitter that is able to emit infrared (IR) light and a detector that is able to detect reflected IR light that is returned toward the proximity sensor. A proximity sensor may include an inertial measurement unit (IMU) configured to identify a presence event in response to measuring movement that matches a movement signature of a user presence event, such as a user picking up the gun 1000. These types of proximity sensors are sometimes called laser imaging, detection, and ranging (LiDAR) scanners. As another example, the gun 1000 may include a fingerprint sensor or camera that generates images which can be used for, for example, biometric authentication. As shown in FIG. 10, outputs produced by the sensor suite 1010 may be provided to the control platform 1012 for examination or analysis.

For convenience, the control platform 1012 may be referred to as a computer program that resides in the memory 1004. However, the control platform 1012 could be comprised of software, firmware, or hardware components that are implemented in, or accessible to, the gun 1000. In accordance with embodiments described herein, the control platform 1012 may include a biometric data manager 1014, a token data manager 1016, an authentication manager 1018, and an enrollment manager 1020. As an illustrative example, the biometric data manager 1014 may process data generated by, and obtained from, an image sensor, the token data manager 1016 may process data generated by, and obtained from, an antenna array, the authentication manager 1018 may process data generated as part of a user authentication procedure, and the enrollment manager 1020 may process data generated as part of a user enrollment procedure. Because the data obtained by these managers may have different formats, structures, and content, the instructions executed by these manager can (and often will) be different. For example, the instructions executed by the biometric data manager 1014 to process data generated by an image sensor may be different from the instructions generated the token data manager 1016 to process data generated by an antenna array. As a specific example, the biometric data manager 1014 may implement image processing algorithms (e.g., despeckling, grayscale transformation, etc.) that are not necessary for processing data generated by an antenna array.

Figure 11:
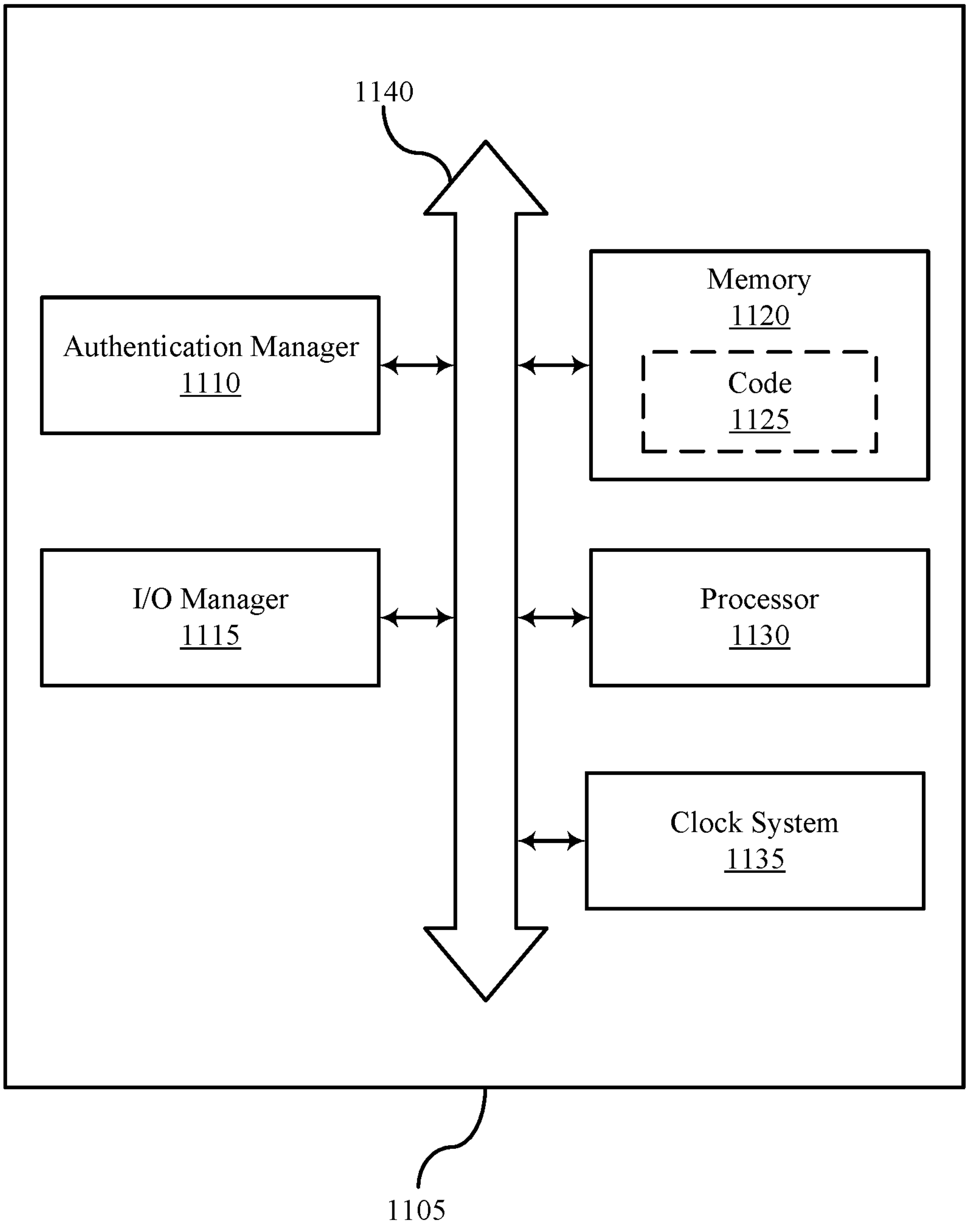
FIG. 11 illustrates an example of a system that supports user authentication in accordance with aspects of the present disclosure.

FIG. 11 illustrates an example of a system 1100 that supports user authentication in accordance with aspects of the present disclosure. The device 1105 may be operable to implement the techniques, technology, or systems disclosed herein. The device 1105 may include components such as an authentication manager 1110, an input/output (I/O) manager 1115, memory 1120, code 1125, a processor 1130, a clock system 1135, and a bus 1140. The components of the device 1105 may communicate via one or more buses 1140. The device 1105 may be an example of, or include components of, a user authentication system, a control platform, or a gun.

The authentication manager 1110 may identify, based on a presence sensor of the device 1105, a presence event corresponding to a user grasping the device 1105 receive, from a first authentication sensor of the device 1105 and based on the identifying the presence event, first query biometric data associated with the user, receive, from a second authentication sensor of the device 1105 and based on the identifying of the presence event, second query biometric data associated with the user, retrieve, in response to the identifying the presence event corresponding to the user grasping the device 1105, enrollment data stored in the memory 1120, perform, in response to the identifying the presence event, an authentication procedure to determine whether the first query biometric data or the second query biometric data matches the enrollment data, where a match is determined based on the first query biometric data or the second query biometric data and the enrollment data satisfying a similarity threshold. The authentication manager 1110 may determine, based on the authentication procedure, that the user is authorized to operate the device 1105, and transmit a signal in response to the determining that the user is authorized to operate the device 1105, the transmitting the signal causing the device 1105 to enter an active state which allows the device 1105 to be fired.

The authentication manager 1110 may receive first query data from a first authentication sensor of the device 1105 and receive second query data from a second authentication sensor of the device 1105. The first query data and the second query data may both be associated with a user. The device 1105 may perform, based on the first query data, an authentication procedure to determine whether the first query data or the second query data matches enrollment data stored in memory of the device 1105, where a match is determined based on the first query data or the second query data and the enrollment data satisfying a similarity threshold. The authentication manager 1110 may determine, based on the authentication procedure, that the user is authorized to operate the device 1105, and transmit a signal in response to the determining that the user is authorized to operate the device 1105, the transmitting the signal causing the device 1105 to enter an active state (e.g., an unlocked state, an armed state, etc.) which allows the device 1105 to be fired. The active state may allow the device 1105 to propel a projectile through a barrel of the device 1105.

The I/O manager 1115 may manage input and output signals for the device 1105. The I/O manager 1115 may also manage various peripherals such an input device (e.g., a button, a display panel, a switch, a touch screen, a dock, a biometric sensor, a pressure sensor, a heat sensor, a proximity sensor, an RFID sensor, etc.) and an output device (e.g., a monitor, a display, an LED, a speaker, a haptic motor, a heat pipe, etc.).

The memory 1120 may include or store code (e.g., software) 1125. The memory 1120 may include volatile memory, such as random-access memory (RAM) and/or non-volatile memory, such as read-only memory (ROM). The code 1125 may be computer-readable and computer-executable, and when executed, the code 1125 may cause the processor 1130 to perform various operations or functions described here.

The processor 1130 may be an example or component of a central processing unit (CPU), an application specific integrated circuit (ASIC), or a field programmable gate array (FPGA). In some embodiments, the processor 1130 may utilize an operating system or software such as Microsoft Windows®, iOS®, Android®, Linux®, Unix®, or the like. The clock system 1135 control a timer for use by the disclosed embodiments.

The authentication manager 1110, or its sub-components, may be implemented in hardware, software (e.g., software or firmware) executed by a processor, or a combination thereof. The authentication manager 1110, or its sub-components, may be physically located in various positions. For example, in some cases, the authentication manager 1110, or its sub-components may be distributed such that portions of functions are implemented at different physical locations by one or more physical components.

Figure 12:
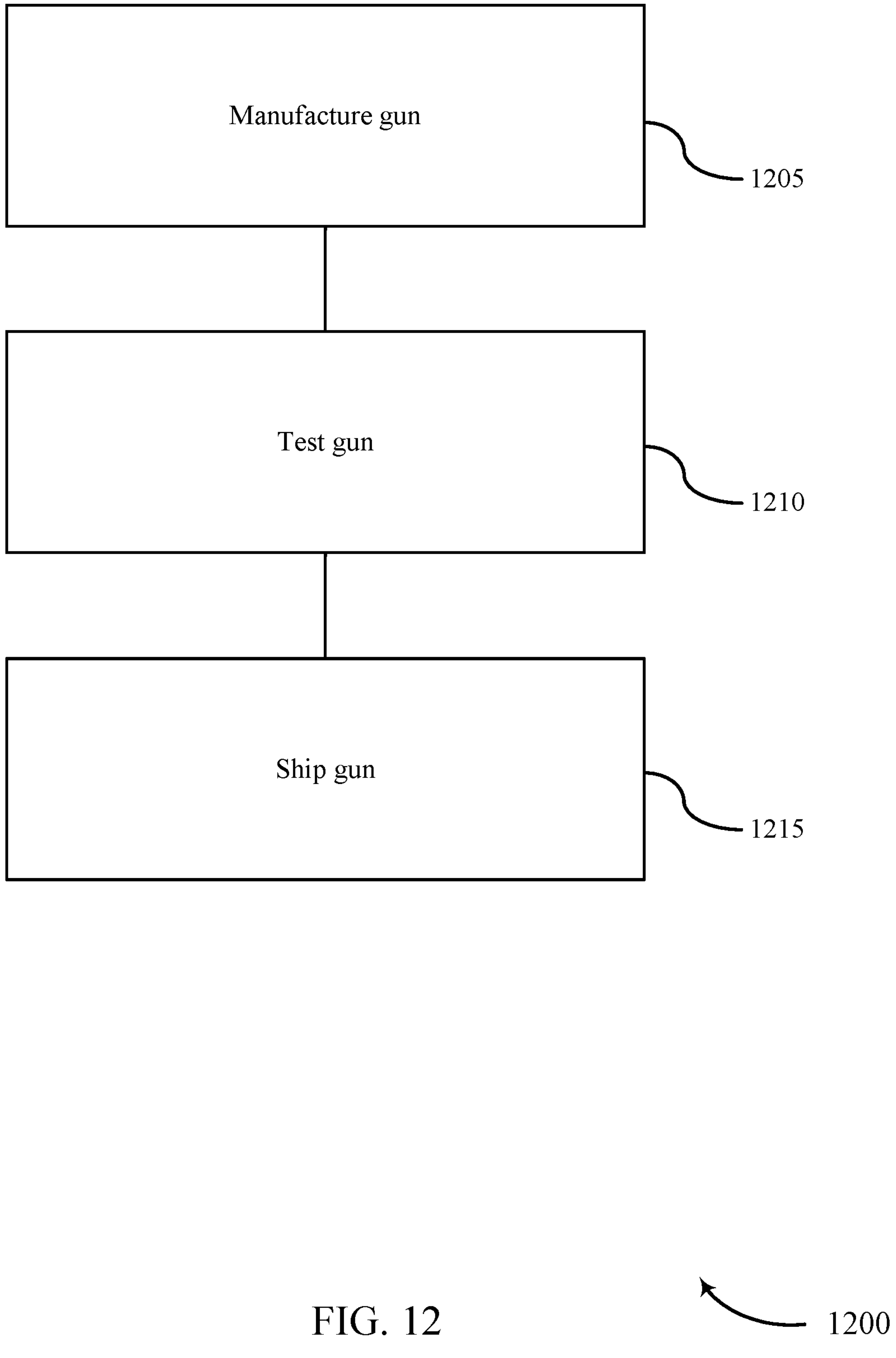
FIG. 12 illustrates an example of a flowchart that supports user authentication in accordance with aspects of the present disclosure.

FIG. 12 illustrates an example of a flowchart 1200 that supports user authentication in accordance with aspects of the present disclosure. Note that while the sequences of the steps performed in the processes described herein are exemplary, the steps can be performed in various sequences and combinations. For example, steps could be added to, or removed from, these processes. Similarly, steps could be replaced or reordered. Thus, the descriptions of these processes are intended to be open ended.

Initially, a gun manufacturer (or simply "manufacturer") may manufacture a gun that is able to implement aspects of the present disclosure (step 1205). For example, the manufacturer may machine, cut, shape, or otherwise make parts to be included in the gun. Thus, the manufacturer may also design those parts before machining occurs, or the manufacturer may verify designs produced by another entity before machining occurs. Additionally or alternatively, the manufacturer may obtain parts that are manufactured by one or more other entities. Thus, the manufacturer may manufacture the gun from components produced entirely by the manufacturer, components produced by other entities, or a combination thereof. Often, the manufacturer will obtain some parts and make other parts that are assembled together to form the gun (or a component of the gun).

The manufacturer may also develop instructions that support authenticating a user at the gun. For example, the manufacturer may produce software and/or firmware that supports user a user enrollment procedure and a user authentication procedure.

In some embodiments, the manufacturer also generates identifying information related to the gun. For example, the manufacturer may etch (e.g., mechanically or chemically), engrave, or otherwise append identifying information onto the gun itself. As another example, the manufacturer may encode at least some identifying information into a data structure that is associated with the gun. For instance, the manufacturer may etch a serial number onto the gun, and the manufacturer may also populate the serial number (and other identifying information) into a data structure for recording or tracking purposes. Examples of identifying information include the make of the gun, the model of the gun, the serial number, the type of projectiles used by the gun, the caliber of those projectiles, the type of firearm, the barrel length, and the like. In some cases, the manufacturer may record a limited amount of identifying information (e.g., only the make, model, and serial number), while in other cases the manufacturer may record a larger amount of identifying information.

The manufacturer may then test the gun (step 1210). In some embodiments, the manufacturer tests all of the guns that are manufactured. In other embodiments, the manufacturer tests a subset of the guns that are manufactured. For example, the manufacturer may randomly or semi-randomly select guns for testing, or the manufacturer may select guns for testing in accordance with a predefined pattern (e.g., one test per 5 guns, 10 guns, or 100 guns). Moreover, the manufacturer may test the gun in its entirety, or the manufacturer may test a subset of its components. For example, the manufacturer may test the component(s) that it manufactures. As another example, the manufacturer may test newly designed components or randomly selected components. Thus, the manufacturer could test select component(s) of the gun, or the manufacturer could test the gun as a whole. For example, the manufacturer may test the barrel to verify that it meets a precision threshold and the cartridge feed system to verify that it meets a reliability threshold. As another example, the manufacturer may test a group of guns (e.g., all guns manufactured during an interval of time, guns selected at random over an interval of time, etc.) to ensure that those guns fire at a sufficiently high pressure (e.g., 70,000 pounds per square inch (PSI)) to verify that a safety threshold is met.

Testing the gun may include testing software and/or firmware. The manufacturer may test the software and/or firmware to validate the security, performance, or reliability of the software and/or firmware. In some examples, the software may be submitted to one or more third-party entities to audit the software and/or firmware. The software and/or firmware may be tested with emulation tools that simulate the hardware of the gun, or the software and/or firmware may be tested on the actual hardware of the gun. In response to testing, the software and/or firmware may be deployed to the gun.

Thereafter, the manufacturer may ship the gun to a dealer (step 1215). In the event that the gun is a firearm, the manufacturer may ship the gun to a Federal Firearms Licensed (FFL) dealer. For example, a purchaser (also referred to as a "customer") may purchase the apparatus through a digital channel or non-digital channel. Examples of digital channels include web browsers, mobile applications, and desktop applications, while examples of non-digital channels include ordering via the telephone and ordering via a physical storefront. In such a scenario, the gun may be shipped to the FFL dealer so that the purchaser can obtain the gun from the FFL dealer. The FFL dealer may be directly or indirectly associated with the manufacturer of the gun. For example, the FFL dealer may be a representative of the manufacturer, or the FFL dealer may sell and distribute guns on behalf of the manufacturer (and possibly other manufacturers).

Note that while the sequences of the steps performed in the processes described herein are exemplary, the steps can be performed in various sequences and combinations. For example, steps could be added to, or removed from, these processes. Similarly, steps could be replaced or reordered. As an example, the manufacturer may iteratively test components while manufacturing the gun, and therefore perform multiple iterations of steps 1205 and 1210 either sequentially or simultaneously (e.g., one component may be tested while another component is added to the gun). Thus, the descriptions of these processes are intended to be open ended.

Figure 13:
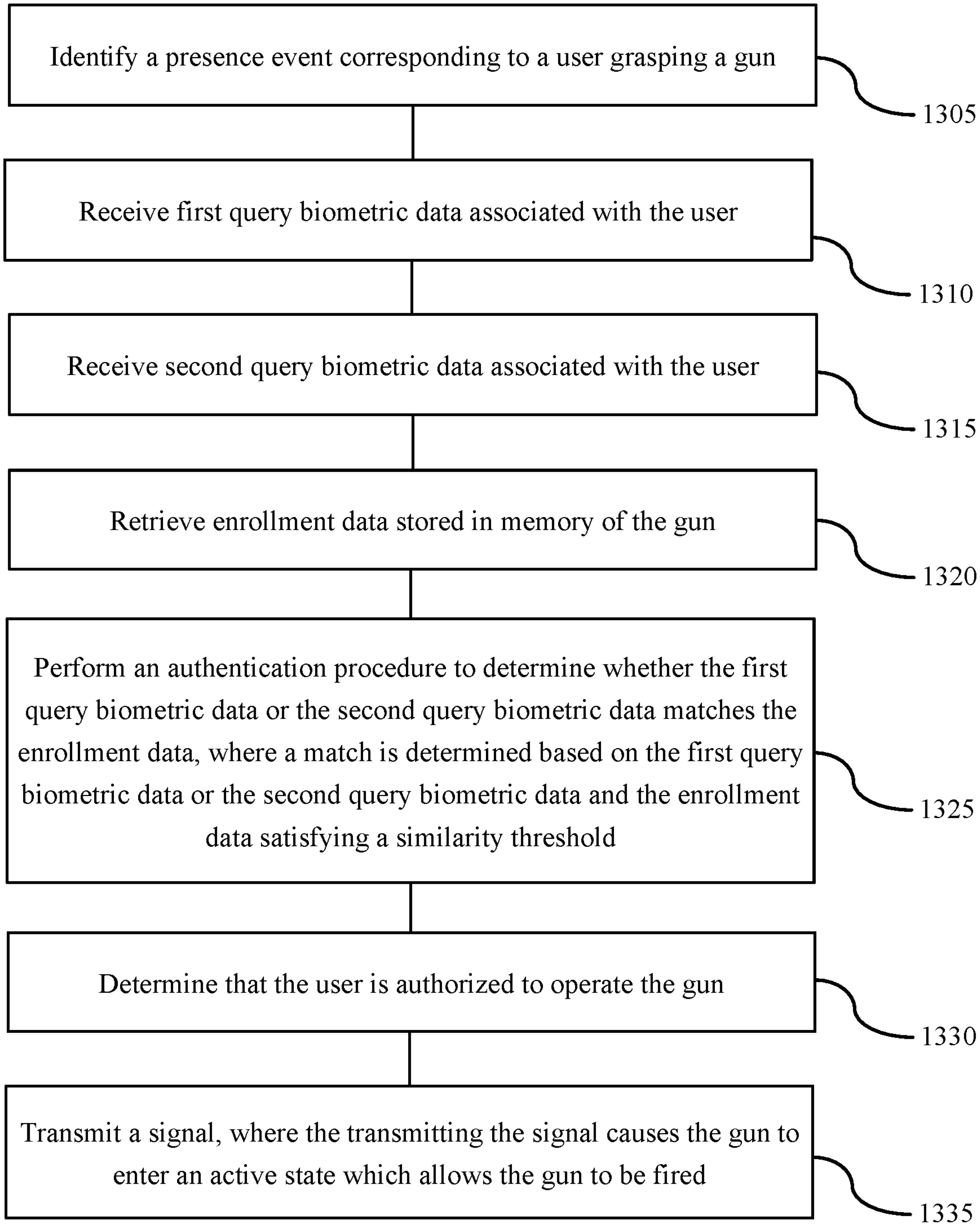
FIG. 13 illustrates an example of a flowchart that supports user authentication in accordance with aspects of the present disclosure.

FIG. 13 shows a flowchart illustrating a method 1300 of authenticating a user at a gun. The operations of the method 1300 may be implemented by an authentication manager, a gun or components thereof. For example, the operations of the method 1300 may be performed by an authentication manager as described with reference to FIGS. 1 through 11. In some examples, a gun may execute a set of instructions to control the functional elements of the gun to perform the described functions. Additionally or alternatively, the gun may perform aspects of the described functions using special-purpose hardware.

At step 1305, the gun may identify a presence event corresponding to a user grasping a gun. The gun may identify the presence event based on a sensor of the gun, such as a photoelectric sensor (also referred to as a "laser sensor" or an "IR sensor"), a capacitive sensor, an inductive sensor, an ultrasonic sensor, a magnetic sensor, a LiDAR sensor, a mechanical switch, a fingerprint scanner, a camera, an accelerometer, or the like. For example, the gun may identify the presence event in response to a signal generated by the sensor. In some examples, the gun may identify the presence event in response to a fingerprint sensor generating a signal.

At step 1310, the gun may receive first query biometric data associated with the user. The first query biometric data may be received from a first authentication sensor, such as a fingerprint sensor. At step 1315, the gun may receive second query biometric data associated with the user. The second query biometric data may be received from a second authentication sensor, such as an image sensor or a camera.

At step 1320, the gun may retrieve enrollment data stored in memory of the gun. The gun may retrieve the enrollment data from the memory in response to the identifying the presence event. The enrollment data may include transformed enrollment data, such as enrollment data that has undergone dimensionality reduction or coordinate shifting. The memory may be coupled with the gun, or the memory may be housed inside the gun, such as inside the grip or a polymer housing of the gun.

At step 1325, the gun may perform an authentication procedure to determine whether the first query biometric data or the second query biometric data matches the enrollment data, where a match is determined based on the first query biometric data or the second query biometric data and the enrollment data satisfying a similarity threshold. In other words, the gun may determine that the first query biometric data matches the enrollment data based on the first query biometric data and the enrollment data satisfying a similarity threshold, or the gun may determine that the second query biometric data matches the enrollment data based on the second query biometric data and the enrollment data satisfying a similarity threshold. In some examples, the first query biometric data may be compared against the enrollment biometric data based on a first similarity threshold and the second query biometric data may be compared against the enrollment biometric data based on a second similarity threshold. The gun may generate a first similarity score for the first query biometric data and a second similarity score for the second query biometric data. The gun may determine that the first query biometric data matches the enrollment data based on the first similarity score satisfying the first similarity threshold (which may, for example, correspond to a fingerprint similarity threshold), and the gun may determine that the second query biometric data matches the enrollment data based on the second similarity score satisfying the second similarity threshold (which may, for example, correspond to a facial similarity threshold).

At step 1330, the gun may determine that the user is authorized to operate the gun. The gun may determine that the user is authorized to operate the gun based on the authentication procedure. As an example, the gun may determine that the user is authorized to operate the gun based on the first query biometric data and the enrollment data satisfying a similarity threshold or based on the second query biometric data and the enrollment data satisfying a similarity threshold. In some examples, the gun may determine that the user is authorized to operate the gun based on the first query biometric data matching the enrollment data, the gun may determine that the user is authorized to operate the gun based on the second query biometric data matching the enrollment data, or the gun may determine that the user is authorized to operate the gun based on the first query biometric data matching the enrollment data and the second query biometric data matching the enrollment data.

At step 1335, the gun may transmit a signal, where the transmitting the signal causes the gun to enter an active state which allows the gun to be fired. For example, the authentication manager may transmit a signal to an I/O pin and the gun may transition to an active (e.g., unlocked) state in response to transmitting the signal to the I/O pin. As another example, the authentication manager may transmit a signal to an inhibitor mechanism (e.g., an electromechanical safety) to disengage the inhibitor mechanism and the gun may transition to an unlocked state in response to transmitting the signal to the inhibitor mechanism. In other words, transmitting the signal to the I/O pin may cause the gun to enter a state that is capable of firing a projectile from the gun, and transmitting the signal to an inhibitor mechanism may disengage a safety mechanism and allow the gun to fire a projectile.

Note that while the sequences of the steps performed in the processes described herein are exemplary, the steps can be performed in various sequences and combinations. For example, steps could be added to, or removed from, these processes. Similarly, steps could be replaced or reordered. Thus, the descriptions of these processes are intended to be open ended.

Figure 14:
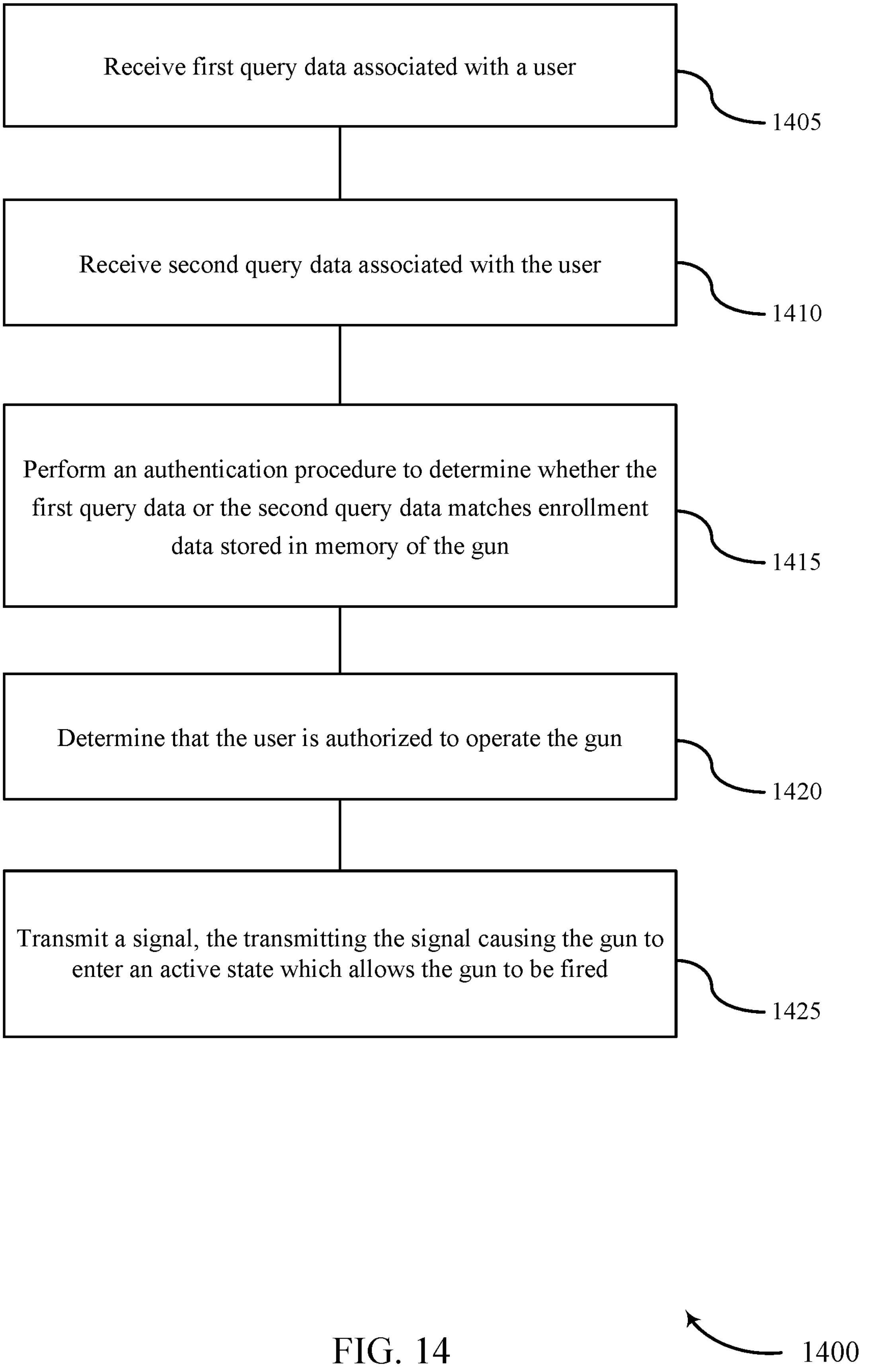
FIG. 14 illustrates an example of a flowchart that supports user authentication in accordance with aspects of the present disclosure.

FIG. 14 shows a flowchart illustrating a method 1400 of authenticating a user at a gun. The operations of the method 1400 may be implemented by a gun or its components as described herein. For example, the operations of the method 1400 may be performed by an authentication manager as described with reference to FIGS. 1 through 11. In some examples, a gun may execute a set of instructions to control the functional elements of the gun to perform the described functions. Additionally or alternatively, the gun may perform aspects of the described functions using special-purpose hardware.

At step 1405, the gun may receive first query data associated with a user. The first query data may be collected at a first authentication sensor, such as a fingerprint scanner. In some examples, the gun may preprocess the first query data and extract a set of query features from the first query data.

At step 1410, the gun may receive second query data associated with the user. The second query data may be collected at a second authentication sensor, such as a camera, an image sensor, a Bluetooth reader, an RFID reader, an NFC reader, a wireless communication chip, or an antenna array. In some examples, the gun may preprocess the second query data and extract a set of query features from the second query data.

At step 1415, the gun may perform an authentication procedure to determine whether the first query data or the second query data matches enrollment data stored in memory of the gun. For example, the gun may generate a first similarity score indicating a level of similarity between the first query data and the enrollment data, and the gun may generate a second similarity score indicating a level of similarity between the second query data and the enrollment data.

At step 1420, the gun may determine that the user is authorized to operate the gun. The gun may determine that the user is authorized to operate the gun in response to determining that the first similarity score satisfies a first similarity threshold, or the gun may determine that the user is authorized to operate the gun in response to determining that the second similarity score satisfies a second similarity threshold. In some cases, the gun may determine that the user is authorized to operate the gun in response to determining that the first similarity score satisfies the first similarity threshold and determining that that the second similarity score satisfies the second similarity threshold. In some examples, the first query data may include biometric data and the second query data may also include biometric data, in other examples, the first query data may include token data and the second query data may also include token data, while in yet other examples, the first query data may include biometric data and the second query data may include token data.

At step 1425, the gun may transmit a signal, the transmitting the signal causing the gun to enter an active state which allows the gun to be fired. For example, the signal may be transmitted to an I/O pin to transition the gun to an active state, or the signal may be transmitted to an inhibitor mechanism to disengage a safety mechanism.

Note that while the sequences of the steps performed in the processes described herein are exemplary, the steps can be performed in various sequences and combinations. For example, steps could be added to, or removed from, these processes. Similarly, steps could be replaced or reordered. Thus, the descriptions of these processes are intended to be open ended.

Figure 15:
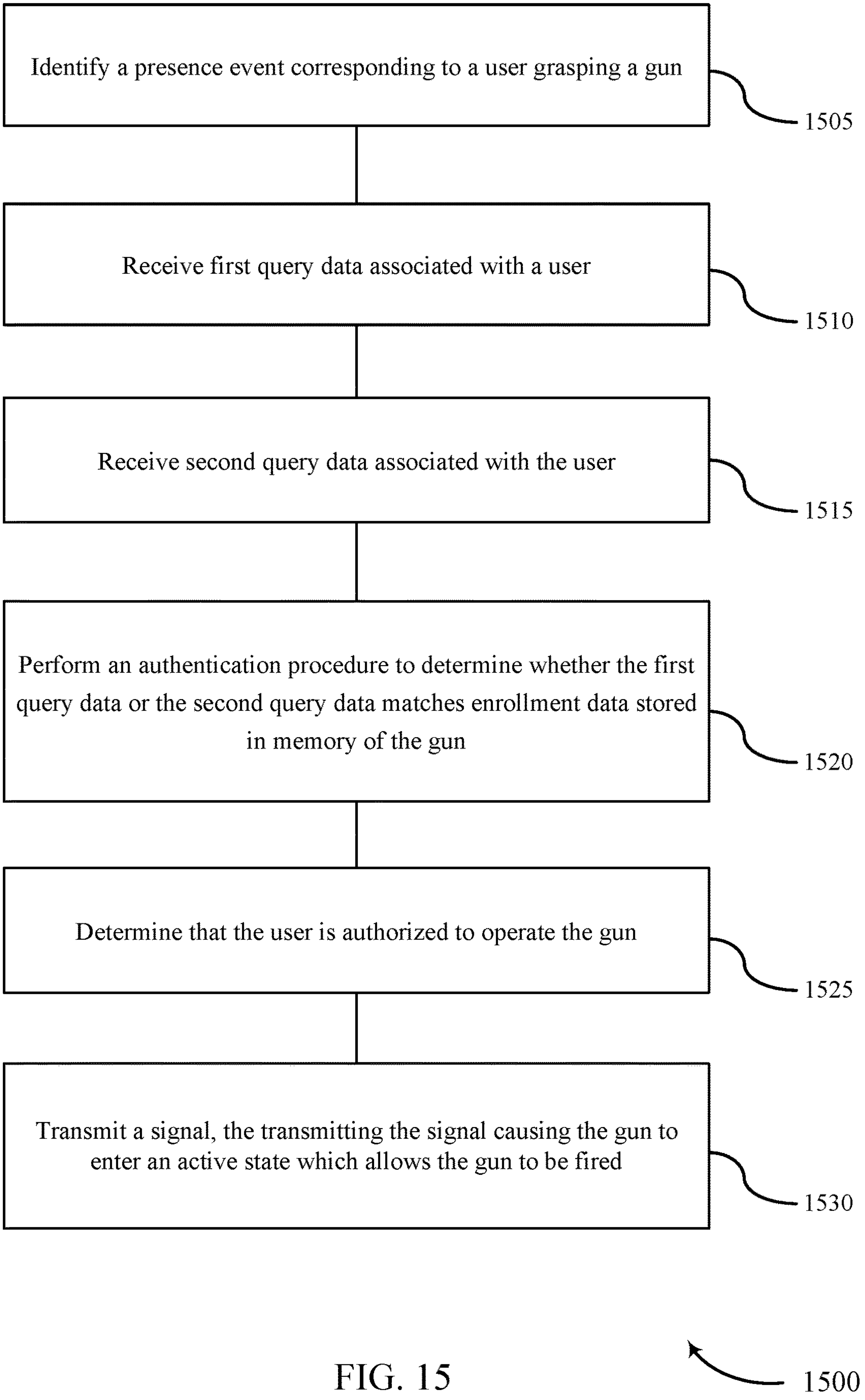
FIG. 15 illustrates an example of a flowchart that supports user authentication in accordance with aspects of the present disclosure.

FIG. 15 shows a flowchart illustrating a method 1500 of authenticating a user at a gun. The operations of the method 1500 may be implemented by a gun or its components as described herein. For example, the operations of the method 1500 may be performed by an authentication manager as described with reference to FIGS. 1 through 11. In some examples, a gun may execute a set of instructions to control the functional elements of the gun to perform the described functions. Additionally or alternatively, the gun may perform aspects of the described functions using special-purpose hardware.

At step 1505, the gun may identify a presence event corresponding to a user grasping a gun. The gun may identify the presence event based on a sensor of the gun. For example, the gun may include a photoelectric sensor and the photoelectric sensor may be activated in response to a user picking up the gun. As another example, the gun may include an IMU and the IMU may be activated in response to a user picking up the gun.

At step 1510, the gun may receive first query data associated with a user. The first query data may be collected at a first authentication sensor of the gun. The first query data may include biometric data.

At step 1515, the gun may receive second query data associated with the user. The second query data may be collected at a second authentication sensor of the gun. As an example, the second query data may include biometric data. As another example, the second query data may include token data.

At step 1520, the gun may perform an authentication procedure to determine whether the first query data or the second query data matches enrollment data stored in memory of the gun. The gun may generate a first similarity score for the first query data and a second similarity score for the second query data. The first similarity score may indicate a similarity of the first query data and the enrollment data, and the second similarity score may indicate a similarity of the second query data and the enrollment data. In some examples, a similarity score may indicate a similarity between query data and a subset of enrollment data. For example, the enrollment data may include enrollment fingerprint data for multiple users and enrolled facial data for multiple users, and a similarity score may indicate the similarity between biometric query data and a piece of biometric enrollment data. A similarity score may be a normalized similarity value ranging from 0 to 1.

At step 1525, the gun may determine that the user is authorized to operate the gun. The gun may determine that the user is authorized the gun based on identifying a data match. In some examples, the gun may generate a similarity score for multiple pieces of enrollment data, identify the highest similarity score, compares the highest similarity score to a similarity threshold, identify a data match based on the highest similarity score satisfying the similarity threshold, and determine that the user is authorized to operate the gun in response to identifying the data match. In some examples, the gun may identify a highest similarity score for the first query data and a highest similarity score for the second query data. The gun may determine that the user is authorized to operate the gun based on the highest similarity score for the first query data satisfying a similarity threshold, based on the highest similarity score for the second query data satisfying a similarity threshold, or based on both the highest similarity score for the first query data satisfying a similarity threshold and the highest similarity score for the second query data satisfying a similarity threshold.

At step 1530, the gun may transmit a signal, the transmitting the signal causing the gun to enter an active state which allows the gun to be fired. For example, the signal may be transmitted to an I/O pin to transition the gun to an active state, or the signal may be transmitted to an inhibitor mechanism to disengage a safety mechanism.

Note that while the sequences of the steps performed in the processes described herein are exemplary, the steps can be performed in various sequences and combinations. For example, steps could be added to, or removed from, these processes. Similarly, steps could be replaced or reordered. Thus, the descriptions of these processes are intended to be open ended.

EXAMPLES

Several aspects of the present disclosure are set forth examples. Note that, unless otherwise specified, all of these examples can be combined with one another. Accordingly, while a feature may be described in the context of a given example, the feature may be similarly applicable to other examples.

In some examples, the techniques described herein relate to a method for using authentication data at a gun to authenticate a user of the gun, the method including: identifying, based on a presence sensor of the gun, a presence event corresponding to the user grasping the gun; receiving, from a first authentication sensor of the gun and based on the identifying the presence event, first query biometric data associated with the user; receiving, from a second authentication sensor of the gun and based on the identifying the presence event, second query biometric data associated with the user; retrieving, in response to the identifying the presence event corresponding to the user grasping the gun, enrollment data stored in memory of the gun; performing, in response to the identifying the presence event, an authentication procedure to determine whether the first query biometric data or the second query biometric data matches the enrollment data, wherein a match is determined based on the first query biometric data or the second query biometric data and the enrollment data satisfying a similarity threshold; determining, based on the authentication procedure, that the user is authorized to operate the gun; and transmitting a signal in response to the determining that the user is authorized to operate the gun, the transmitting the signal causing the gun to enter an active state which allows the gun to be fired.

In some examples, the techniques described herein relate to a method for authenticating a user at a gun, the method including: receiving, from a first authentication sensor of the gun, first query data associated with the user; receiving, from a second authentication sensor of the gun, second query data associated with the user; performing, based on the first query data associated with the user, an authentication procedure to determine whether the first query data or the second query data matches enrollment data stored in memory of the gun, wherein a match is determined based on the first query data or the second query data and the enrollment data satisfying a similarity threshold; determining, based on the authentication procedure, that the user is authorized to operate the gun; and transmitting a signal in response to the determining that the user is authorized to operate the gun, the transmitting the signal causing the gun to enter an active state which allows the gun to be fired.

In some examples, the techniques described herein relate to a method, further including: identifying, based on a sensor of the gun, a presence event corresponding to the user grasping the gun, wherein the performing the authentication procedure is in response to the identifying the presence event.

In some examples, the techniques described herein relate to a method, wherein the sensor includes a proximity sensor, and the identifying the presence event includes the proximity sensor indicating an active presence threshold is satisfied.

In some examples, the techniques described herein relate to a method, further including: determining that the presence event has subsided based on (i) analysis of a signal output by the sensor and (ii) lack of a signal output by the sensor.

In some examples, the techniques described herein relate to a method, wherein the performing the authentication procedure further includes: determining that the first query data matches the enrollment data; and determining that the second query data matches the enrollment data.

In some examples, the techniques described herein relate to a method, further including: identifying, based on a sensor of the gun, a loss of presence event corresponding to the user releasing the gun; and locking the gun in response to the identifying the loss of presence event.

In some examples, the techniques described herein relate to a method, wherein the sensor includes a proximity sensor, and the identifying the loss of presence event includes the proximity sensor indicating an inactive presence threshold is satisfied.

In some examples, the techniques described herein relate to a method, further including: indicating a result of the authentication procedure, wherein the result of the authentication procedure is based on whether the first query data or second query data matches the enrollment data, and wherein the result of the authentication procedure is a successful authentication of the user or an unsuccessful authentication of the user.

In some examples, the techniques described herein relate to a method, wherein the indicating the result of the authentication procedure includes: illuminating an aiming sight with a color, illuminating a display panel with a color, displaying an icon at the display panel, generating an audible tone, generating a haptic pulse pattern, or any combination thereof.

In some examples, the techniques described herein relate to a method, further including: receiving, at the gun, a user-input granting permission to log data related to authentication attempts at the gun; unlocking a fuzzy vault based on the user-input and the first query data; and logging, based on the user-input, an indication of a result of the authentication procedure in the fuzzy vault, the fuzzy vault storing the indication of the result in memory of the gun, wherein the result of the authentication procedure is a successful authentication of the user or an unsuccessful authentication of the user.

In some examples, the techniques described herein relate to a method, wherein the second query data includes a radio frequency identification (RFID) signal acquired from an RFID tag, and the determining that the user is authorized to operate the gun is based on the second query data matching the enrollment data.

In some examples, the techniques described herein relate to a method, further including: transforming the first query data, wherein the determining whether the first query data matches the enrollment data includes determining whether the transformed first query data matches the enrollment data. In some examples, the first query data is transformed first query and the determining whether the first query data matches the enrollment data includes determining whether the transformed first query data matches the enrollment data.

In some examples, the techniques described herein relate to a method, wherein the transforming the first query data includes feeding the first query data into a one-way function.

In some examples, the techniques described herein relate to a method, wherein the transforming the first query data includes feeding the first query data into a key-binding function.

In some examples, the techniques described herein relate to a method for enrolling a user of a gun, the method including: receiving, from a first authentication sensor of the gun, first enrollment biometric data; receiving, from a second authentication sensor of the gun, second enrollment data; transforming the first enrollment biometric data into first transformed data; transforming the second enrollment data into second transformed data; generating a user profile for the user, the user profile including the first transformed data and the second transformed data; and storing the user profile in non-volatile memory of the gun.

In some examples, the techniques described herein relate to a method, further including: refraining from storing the first enrollment biometric data in the non-volatile memory of the gun; and refraining from storing the second enrollment data in the non-volatile memory of the gun. In some examples, the first enrollment biometric data is non-transformed and the second enrollment biometric data is non-transformed.

In some examples, the techniques described herein relate to a method, further including: discarding the first enrollment biometric data such that the first enrollment biometric data is not stored in the non-volatile memory of the gun; and discarding the second enrollment biometric data such that the second enrollment biometric data is not stored in the non-volatile memory of the gun. In some examples, the first enrollment biometric data is non-transformed and the second enrollment biometric data is non-transformed.

In some examples, the techniques described herein relate to a method, further including: determining that the gun is in a new state corresponding to a brand-new state or a factory reset state, wherein the generating the user profile is based on determining that the gun is in the new state.

In some examples, the techniques described herein relate to a method, further including: displaying a first prompt for biometric input at a display panel, wherein the receiving the first enrollment biometric data is in based on the displaying the first prompt for biometric input; and displaying a second prompt for input at the display panel, wherein the receiving the second enrollment data is in based on the displaying the second prompt for input. In some examples, the prompt is a text prompt shown at a display panel of the gun, a display panel of a dock, or a display panel of a mobile device.

In some examples, the techniques described herein relate to a method, further including: receiving query biometric data from the first authentication sensor or the second authentication sensor; and determining that the query biometric data corresponds to a primary user of the gun; wherein the generating the user profile is based on determining that the query biometric data corresponds to the primary user of the gun.

In some examples, the techniques described herein relate to a method, further including: receiving first query biometric data from the first authentication sensor and second query biometric data from the second authentication sensor; and determining that the first query biometric data and the second query biometric data correspond to a primary user of the gun; wherein the generating the user profile is based on determining that the first query biometric data and the second query biometric data correspond to the primary user of the gun.

In some examples, the techniques described herein relate to a method, including: generating a transformation key at the gun, wherein the transforming the first enrollment biometric data is based on the transformation key. In some examples, the transformation key is a cryptographic key, a random projecting matrix, a coordinate shifting key, or a pseudo random seed value.

In some examples, the techniques described herein relate to a method, including: collecting entropy data based on an accelerometer coupled with the gun, wherein the generating the transformation key is based on a key derivation function and the entropy data.

In some examples, the techniques described herein relate to a method, including: receiving query biometric data from the first authentication sensor or the second authentication sensor; determining that the query biometric data corresponds to the user; and performing a function at a component of the gun in response to the determining that the query biometric data corresponds to the user.

In some examples, the techniques described herein relate to a method, including: receiving, at a display panel, user-input indicating a state for the component of the gun, wherein the performing the function results in the component of the gun being in the state.

In some examples, the techniques described herein relate to a method, wherein the component is flashlight, a laser, an aiming sight, a light-emitting diode, a display panel, a haptic motor, or a speaker.

In some examples, the techniques described herein relate to a method, wherein the function is powering on the component, illuminating the component with a color, displaying an icon on the component, displaying a message on the component, generating a sound, or generating a haptic pulse.

In some examples, the techniques described herein relate to a method, including: producing a measurement of light at an ambient light sensor of the gun, wherein the performing the function is based on the measurement of light.

In some examples, the techniques described herein relate to a method, including: generating a transformation key at the gun, wherein the transforming the first enrollment biometric data is based on the transformation key.

In some examples, the techniques described herein relate to a method, wherein the user profile includes a unique identifier for the user, a permission level for the user, or a configuration indicating a state for a component of the gun.

In some examples, the techniques described herein relate to a gun, including: a processor; an authentication manager configured to transmit a wake-up interrupt to the processor based on activation of a sensor coupled with the gun; an image sensor on a rear surface below a slide mechanism; and a fingerprint sensor on a grip of the gun, the fingerprint sensor being located on the grip to facilitate an index finger contacting the fingerprint sensor as a user grasps the gun.

In some examples, the techniques described herein relate to a gun, including: a proximity sensor configured to indicate a user presence event.

In some examples, the techniques described herein relate to a gun, wherein an inter-integrated circuit (I2C) channel is coupled with the proximity sensor.

In some examples, the techniques described herein relate to a gun, further including: a communication channel coupled with the processor, wherein the communication channel is an I2C channel, a universal asynchronous receiver-transmitter (UART) channel, a serial peripheral interface (SPI) channel, a peripheral component interconnect (PCI) express channel, a universal serial bus (USB) channel, or a system management bus (SMB).

In some examples, the techniques described herein relate to a gun, further including: identifying an occurrence of a presence event based on analysis of values output by a presence sensor coupled with a gun, wherein the presence event corresponds to one or more values that are indicative of the gun being grasped by an unknown person, obtaining (i) first data generated by a first authentication sensor coupled with the gun and (ii) second data generated by a second authentication sensor coupled with the gun, retrieving, from memory of the gun, third data generated during an enrollment procedure that involves an individual being authenticated as an operator of the gun, determining whether to authenticate the unknown person as the operator based on a comparison of the first and second data to the third data, in response to a determination that the unknown person is the operator, generating a signal so as to allow for operation of the gun, wherein said generating causes the gun to enter an active state in which the gun is permitted to be fired.

In some examples, the techniques described herein relate to establishing a user as an authenticated operator of a gun, further including: receiving (i) first biometric data that is output by a first biometric sensor included in the gun and (ii) second biometric data that is output by a second biometric sensor included in the gun, applying a first transformation function to the first biometric data, so as to produce first transformed data, applying a second transformation function to the second biometric data, so as to produce second transformed data, and storing the first and second transformed data in a data structure that is representative of an operator profile, wherein the operator profile includes (i) an identifier associated with the authenticated operator, (ii) the first transformed data that serves as a reference against which outputs produced by the first biometric sensor are comparable, (iii) the second transformed data that serves as a reference against which outputs produced by the second biometric sensor are comparable, and (iv) a permission level indicating one or more actions that are permitted in the event that an unknown user is determined to be the authenticated operator.

In some examples, the techniques described herein relate to enrolling a user as an operator of a gun, further including: receiving biometric data from an authentication sensor of the gun, extracting a set of features from the biometric data, generating a pseudo random number using a random number generator of the gun, generating a cryptographic key by performing a key derivation function that uses the pseudo random number as input and produces the cryptographic key as output, performing a key binding procedure that uses the set of features and the cryptographic key as input and produces helper data as output, and storing the helper data in non-volatile memory of the gun.

In some examples, the techniques described herein relate to a method, further including: generating a hash value based on a hash function that uses the cryptographic key as input and produces the hash value as output, and storing the hash value in the non-volatile memory of the gun.

In some examples, the techniques described herein relate to a method, further including: receiving additional authentication data from the authentication sensor, generating an additional cryptographic key by performing a key derivation function that uses the helper data and the additional biometric data as input and produces the additional cryptographic key as output, and determining that the additional biometric data corresponds to a valid user based on validating the additional cryptographic key.

In some examples, validating the additional cryptographic key may include: generating an additional hash value based on the hash function that uses the additional cryptographic kay as input and produces the additional hash value as output, where the additional cryptographic key is validated in response to determining that the additional hash value is the same as the hash value.

Remarks

The Detailed Description provided herein, in connection with the appended figures (or drawings), describes example configurations and does not represent all the examples that may be implemented or that are within the scope of the claims. The term "example" used herein means "serving as an illustration or instance," and not "a preferred example."

The functions described herein may be implemented with a controller. A controller may include an authentication manager, a special-purpose processor, a general-purpose processor, a digital signal processor (DSP), a CPU, a graphics processing unit (GPU), a microprocessor, a tensor processing unit (TPU), a neural processing unit (NPU), an image signal processor (ISP), a hardware security module (HSM), an ASIC, a programmable logic device (such as an FPGA), a state machine, a circuit (such as a circuit including discrete hardware components, analog components, or digital components), or any combination thereof. Some aspects of a controller may be programmable, while other aspects of a control may not be programmable. In some examples, a digital component of a controller may be programmable (such as a CPU), and in some other examples, an analog component of a controller may not be programmable (such as a differential amplifier).

In some cases, instructions or code for the functions described herein may be stored on or transmitted over a computer-readable medium, and components implementing the functions may be physically located at various locations. Computer-readable media includes both non-transitory computer storage media and communication media. A non-transitory storage medium may be any available medium that may be accessed by a computer or component. For example, non-transitory computer-readable media may include RAM, SRAM, DRAM, ROM, EEPROM, flash memory, magnetic storage devices, or any other non-transitory medium that may be used to carry and/or store program code means in the form of instructions and/or data structures. The instructions and/or data structures may be accessed by a special-purpose processor, a general-purpose processor, a manager, or a controller. A computer-readable media may include any combination of the above, and a compute component may include computer-readable media.

A claim is not intended to invoke means-plus-function interpretation (or step-plus-function interpretation) unless the claim uses the phrase "means for" together with an associated function. When a means-plus-function interpretation does apply to a clause in a claim, the given clause is intended to cover the structures describe herein as performing the associated function, including both structural equivalents that operate in the same manner, and equivalent structures that provide the same function.

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling those skilled in the relevant art to understand the claimed subject matter, the various embodiments, and the various modifications that are suited to the particular uses contemplated.

Although the Detailed Description describes certain embodiments and the best mode contemplated, the technology can be practiced in many ways no matter how detailed the Detailed Description appears. Embodiments may vary considerably in their implementation details, while still being encompassed by the specification. Particular terminology used when describing certain features or aspects of various embodiments should not be taken to imply that the terminology is being redefined herein to be restricted to any specific characteristics, features, or aspects of the technology with which that terminology is associated. In general, the terms used in the following claims should not be construed to limit the technology to the specific embodiments disclosed in the specification, unless those terms are explicitly defined herein. Accordingly, the actual scope of the technology encompasses not only the disclosed embodiments, but also all equivalent ways of practicing or implementing the embodiments.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

What is claimed is:

1. A method for enrolling a user of a gun, the method comprising:

receiving, from a first authentication sensor of the gun, first enrollment biometric data;

receiving, from a second authentication sensor of the gun, second enrollment data;

transforming the first enrollment biometric data into first transformed data;

transforming the second enrollment data into second transformed data;

generating a user profile for the user, the user profile comprising the first transformed data and the second transformed data;

storing the user profile in non-volatile memory of the gun;

receiving query biometric data from the first authentication sensor or the second authentication sensor;

determining that the query biometric data corresponds to the user;

producing a measurement of light at an ambient light sensor of the gun; and performing, based on the measurement of light, a function at a component of the gun in response to the determining that the query biometric data corresponds to the user.

2. The method of claim 1, further comprising:

refraining from storing the first enrollment biometric data in the non-volatile memory of the gun; and refraining from storing the second enrollment data in the non-volatile memory of the gun.

3. The method of claim 1, further comprising:

discarding the first enrollment biometric data such that the first enrollment biometric data is not stored in the non-volatile memory of the gun; and discarding the second enrollment data such that the second enrollment data is not stored in the non-volatile memory of the gun.

4. The method of claim 1, further comprising:

determining that the gun is in a new state corresponding to a brand-new state or a factory reset state, wherein the generating the user profile is based on determining that the gun is in the new state.

5. The method of claim 1, further comprising:

displaying a first prompt for biometric input at a display panel, wherein the receiving the first enrollment biometric data is in based on the displaying the first prompt for biometric input; and displaying a second prompt for input at the display panel, wherein the receiving the second enrollment data is in based on the displaying the second prompt for input.

6. The method of claim 1, further comprising:

receiving query biometric data from the first authentication sensor or the second authentication sensor; and determining that the query biometric data corresponds to a primary user of the gun;

wherein the generating the user profile is based on determining that the query biometric data corresponds to the primary user of the gun.

7. The method of claim 1, further comprising:

receiving first query biometric data from the first authentication sensor and second query biometric data from the second authentication sensor; and determining that the first query biometric data and the second query biometric data correspond to a primary user of the gun;

wherein the generating the user profile is based on determining that the first query biometric data and the second query biometric data correspond to the primary user of the gun.

8. The method of claim 1, further comprising:

generating a transformation key at the gun, wherein the transforming the first enrollment biometric data is based on the transformation key.

9. The method of claim 1, further comprising:

receiving, at a display panel, user-input indicating a state for the component of the gun, wherein the performing the function results in the component of the gun being in the state.

10. The method of claim 1, wherein the component is a flashlight, a laser, an aiming sight, a light-emitting diode, a display panel, a haptic motor, or a speaker.

11. The method of claim 1, wherein the function is powering on the component, illuminating the component with a color, displaying an icon on the component, displaying a message on the component, generating a sound, or generating a haptic pulse.

12. The method of claim 1, wherein the user profile comprises a unique identifier for the user, a permission level for the user, or a configuration indicating a state for the component of the gun.

13. A method for enrolling a user of a gun, the method comprising:

receiving, from a first authentication sensor of the gun, first enrollment biometric data;

receiving, from a second authentication sensor of the gun, second enrollment data;

collecting entropy data based on an accelerometer coupled with the gun;

generating a transformation key at the gun based on the entropy data and a key derivation function;

transforming the first enrollment biometric data into first transformed data based on the transformation key;

transforming the second enrollment data into second transformed data;

generating a user profile for the user, the user profile comprising the first transformed data and the second transformed data; and storing the user profile in non-volatile memory of the gun.

14. The method of claim 9, further comprising:

receiving query biometric data from the first authentication sensor or the second authentication sensor;

determining that the query biometric data corresponds to the user; and performing a function at a component of the gun in response to the determining that the query biometric data corresponds to the user.

15. The method of claim 14, further comprising:

producing a measurement of light at an ambient light sensor of the gun, wherein the performing the function is based on the measurement of light.

* * * * *